US012512907B2

United States Patent
Goto et al.

(10) Patent No.: US 12,512,907 B2
(45) Date of Patent: Dec. 30, 2025

(54) WIRELESS COMMUNICATION SYSTEM, COMMUNICATION APPARATUS, WIRELESS COMMUNICATION METHOD AND COMMUNICATION PROGRAM

(71) Applicant: NTT, Inc., Tokyo (JP)

(72) Inventors: Daisuke Goto, Musashino (JP); Kiyohiko Itokawa, Musashino (JP); Yasuyoshi Kojima, Musashino (JP); Fumihiro Yamashita, Musashino (JP)

(73) Assignee: NTT, Inc., Tokyo (JP)

( * ) Notice: Subject to any disclaimer, the term of this patent is extended or adjusted under 35 U.S.C. 154(b) by 549 days.

(21) Appl. No.: 17/922,805

(22) PCT Filed: May 25, 2020

(86) PCT No.: PCT/JP2020/020494
§ 371 (c)(1),
(2) Date: Nov. 2, 2022

(87) PCT Pub. No.: WO2021/240583
PCT Pub. Date: Dec. 2, 2021

(65) Prior Publication Data
US 2023/0170988 A1 Jun. 1, 2023

(51) Int. Cl.
*H04B 7/185* (2006.01)
(52) U.S. Cl.
CPC ..... *H04B 7/18536* (2013.01); *H04B 7/18547* (2013.01)
(58) Field of Classification Search
None
See application file for complete search history.

(56) References Cited

U.S. PATENT DOCUMENTS

2019/0261215 A1* 8/2019 Engelen ............. H04B 7/18513

FOREIGN PATENT DOCUMENTS

JP 2019-047262 A 3/2019

OTHER PUBLICATIONS

Daichi Kominami et al., "Self-organized transmission scheduling for LPWA networks considering gateway load balancing", Technical Report of IEICE, the Institute of Electronics, Information and Communication Engineers, vol. 117, No. 353, IN2017-67, pp. 127-132, Dec. 2017.

(Continued)

*Primary Examiner* — Minh Trang T Nguyen

(57) ABSTRACT

In a wireless communication system in which a relay apparatus provided in a mobile object wirelessly communicates with a plurality of communication apparatuses placed at different locations, the relay apparatus includes a receiver that receives a signal transmitted from each of the plurality of communication apparatus, the signal including position information indicating a position of each communication apparatus, a measurement unit that measures a congestion level of communication, a control unit that divides a communication target area into a plurality of small areas in accordance with the positions of the plurality of communication apparatuses and the congestion level of communication and generates area information indicating a position of each of the small areas, and a transmitter that sequentially transmits a plurality of pieces of the area information when the relay apparatus is positioned in a range in which the relay apparatus can communicate with the communication apparatuses, and each communication apparatus includes a storage unit that stores transmission data, a receiver that receives the area information, a control unit that determines whether a position of the communication apparatus is included in the small area in accordance with the area information, and a (Continued)

transmitter that transmits a signal including the transmission data and position information indicating a position of the communication apparatus to the relay apparatus when the position of the communication apparatus is included in the small area.

7 Claims, 13 Drawing Sheets

(56) References Cited

OTHER PUBLICATIONS

S. Xia et al., "Beam Coverage Comparison of LEO Satellite Systems Based on User Diversification", IEEE Access, vol. 7, IEEE, Dec. 16, 2019, pp. 181656-181667.

* cited by examiner

WIRELESS COMMUNICATION SYSTEM, COMMUNICATION APPARATUS, WIRELESS COMMUNICATION METHOD AND COMMUNICATION PROGRAM

CROSS-REFERENCE TO RELATED APPLICATIONS

This application is a 371 U.S. National Phase of International Application No. PCT/JP2020/020494, filed on May 25, 2020. The entire disclosure of the above application is incorporated herein by reference.

TECHNICAL FIELD

The present disclosure relates to a wireless communication system, a communication apparatus, a wireless communication method and a communication program.

BACKGROUND ART

Internet of Things (IoT) systems that implement various applications by connecting compact terminal apparatuses to the Internet have become popular. As an application of such IoT systems, a system is known in which a plurality of IoT terminals detect environmental information such as an air temperature, a room temperature, an acceleration, and a luminous intensity and transmit the information in wireless signals, and a cloud side collects the environmental information. Such IoT terminals with various sensors are installed at various places. For example, the IoT will be utilized to collect data at places where base stations are not easily installed, such as marine buoys, ships, mountainous areas, and the like.

Some wireless systems communicate wirelessly with a plurality of communication apparatuses on the ground using a communication satellite, an unmanned aerial vehicle (UAV), or the like as a relay station. Examples of the wireless system using a communication satellite as a relay station include a case of using a low Earth orbit (LEO) satellite orbiting a low orbit at an altitude of around 1,000 km and a case of using a geostationary orbit (GEO) satellite orbiting at an altitude of 36,000 km. A LEO satellite has shorter propagation distances compared to a GEO satellite. Thus, using a LEO satellite as a relay station enables communication with a low latency and low propagation loss. In this case, a high-frequency circuit included in such a LEO satellite or a communication apparatus on the ground has a simple configuration. However, because such a LEO satellite orbits around over the Earth unlike a GEO satellite, the direction of the LEO satellite viewed from the communication apparatus on the ground changes constantly. A period of time in which the LEO satellite is visible to each communication apparatus on the ground in one orbiting cycle of the satellite is several minutes. For this reason, the time slot in which the LEO satellite can communicate with each communication apparatus on the ground is limited.

Low-power wide-area (LPWA) is known as a wireless system in which wide-range communication that is suitable for communication with IoT terminals is possible with low power and low transmission rates. A satellite IoT system has been recently studied in which a communication satellite collects data from IoT terminals using LPWA. Commonly, wireless communication between a communication satellite and a communication apparatus on the ground has a long propagation distance compared to wireless communication that directly communicate with a plurality of communication apparatuses on the ground. However, LPWA can be applied when a LEO satellite is used. Such a satellite IoT system can store IoT terminals used in the fields of aviation and marine vessels, and rural areas in which a normal LPWA is not suitable for IoT communication. In such case, no hub station is required, and service development would be easy.

The number of IoT terminals has been increasing recently. In addition, the LPWA has a low data rate, and thus a period of time when an IoT terminal transmits data is relatively long. For this reason, as the number of IoT terminals increases, data packet collisions might increase. In this regard, for example, NPL 1 describes a technique for avoiding the collisions when a base station receives data, by an autonomously distributed transmission schedule control of a terminal in a LPWA network. The technique described in PTL 1 expresses a transmission timing of each terminal by a phase oscillator model. When there is data to be transmitted, each terminal stands by until the phase of the terminal reaches 0 and then transmits the data. The technique avoids data collisions by setting a reverse-phase synchronization state in which the phases of all terminals are evenly spaced from each other.

CITATION LIST

Non Patent Literature

NPL 1: Daichi Kominami, Ikkyu Aihara, Masayuki Murata, "Self-organized Transmission Scheduling for LPWA Networks Considering Gateway Load Balancing", Technical Research Report of Institute of Electronics, Information and Communication Engineers (IEICE technical report), vol. 117, no. 353 IN 2017-67, pp. 127-132, December 2017

SUMMARY OF THE INVENTION

Technical Problem

In an IoT system, each IoT terminal may repeat data transmission to a base station multiple times to ensure communication reliability. A plurality of IoT terminals transmit data, and thus the number of slots may exceed the number of transmission occasions exceeding the number of slots may occur. As such, in the IoT system, the congestion level of communication may vary sometimes. However, according to the technique described in NPL 1, each of terminals uniformly transmits data at different timings assigned to the terminals. The technique does not control transmission schedules according to an occupancy status of the base station. For this reason, the technique described in NPL 1 may cause data collision and reduce the reliability of communication when a congestion level of the communication varies.

In view of the above-described circumstances, an objective of the present disclosure is to provide a wireless communication system, a communication apparatus, a wireless communication method and a communication program capable of preventing communication reliability from reducing when a congestion level of communication varies.

Means for Solving the Problem

An aspect of the present disclosure is a wireless communication system in which a relay apparatus provided in a mobile object wirelessly communicates with a plurality of communication apparatuses placed at different locations.

The relay apparatus includes a relay apparatus receiver that receives a signal transmitted from each of the plurality of communication apparatus, the signal including position information indicating a position of each communication apparatus, a measurement unit that measures a congestion level of communication in the relay apparatus receiver, a relay apparatus control unit that divides a communication target area into a plurality of small areas in accordance with the positions of the plurality of communication apparatuses and the congestion level of communication and generates area information indicating a position of each of the small areas, and a relay apparatus transmitter that sequentially transmits a plurality of pieces of the area information when the relay apparatus is positioned in a range in which the relay apparatus can communicate with the communication apparatuses. The communication apparatus of the plurality of communication apparatuses includes a storage unit that stores transmission data to be transmitted to the relay apparatus, a communication apparatus receiver that receives the area information, a communication apparatus control unit that determines whether a position of the communication apparatus is included in the small area in accordance with the area information, and a communication apparatus transmitter that transmits a signal including the transmission data and position information indicating a position of the communication apparatus to the relay apparatus when the position of the communication apparatus is included in the small area.

In addition, an aspect of the present disclosure is a communication apparatus that wirelessly communicates with a relay apparatus provided in a mobile object. The communication apparatus includes a storage unit that stores transmission data to be transmitted to the relay apparatus and orbit information indicating an orbit of the mobile object; a control unit that identifies a communicable time slot in accordance with the orbit information and a position of the communication apparatus, the communicable time slot being a time slot in which communication with the relay apparatus is possible; and a transmitter that transmits the transmission data to the relay apparatus in the communicable time slot.

Further, an aspect of the present disclosure is a wireless communication method in which a relay apparatus provided in a mobile object wirelessly communicates with a plurality of communication apparatuses placed at different locations. The wireless communication method includes: by the relay apparatus, receiving a plurality of signals transmitted from the plurality of communication apparatuses and including position information indicating positions of the plurality of communication apparatuses; measuring a congestion level of communication in the receiving of the signal; dividing a communication target area into a plurality of small areas in accordance with the positions of the plurality of communication apparatuses and the congestion level of communication and generate area information indicating positions of the plurality of small areas; and sequentially transmitting a plurality of pieces of the area information when the relay apparatus is positioned in a range in which the relay apparatus can communicate with the plurality of communication apparatuses, and by each of the plurality of communication apparatuses, storing transmission data to be transmitted to the relay apparatus; receiving the area information; determining whether a position of the communication apparatus is included in the plurality of small areas indicated in the area information; and transmitting a signal including the transmission data and position information indicating a position of the communication apparatus to the relay apparatus in a case in which the position of the communication apparatus is included in the plurality of small areas.

In addition, an aspect of the present disclosure is a wireless communication method for wireless communication with a relay apparatus provided in a mobile object. The wireless communication method includes storing transmission data to be transmitted to the relay apparatus and orbit information indicating an orbit of the mobile object; identifying a communicable time slot in accordance with the orbit information and a position of the communication apparatus, the communicable time slot being a time slot in which communication with the relay apparatus is possible; and transmitting the transmission data to the relay apparatus in the communicable time slot.

An aspect of the present disclosure is a communication program for functioning as the communication apparatus.

Effects of the Invention

According to the present disclosure, communication reliability can be prevented from decreasing when a congestion level of the communication varies.

DESCRIPTION OF EMBODIMENTS

Hereinafter, embodiments of the present disclosure will be described in detail with reference to the drawings.

First Embodiment

Figure 1:
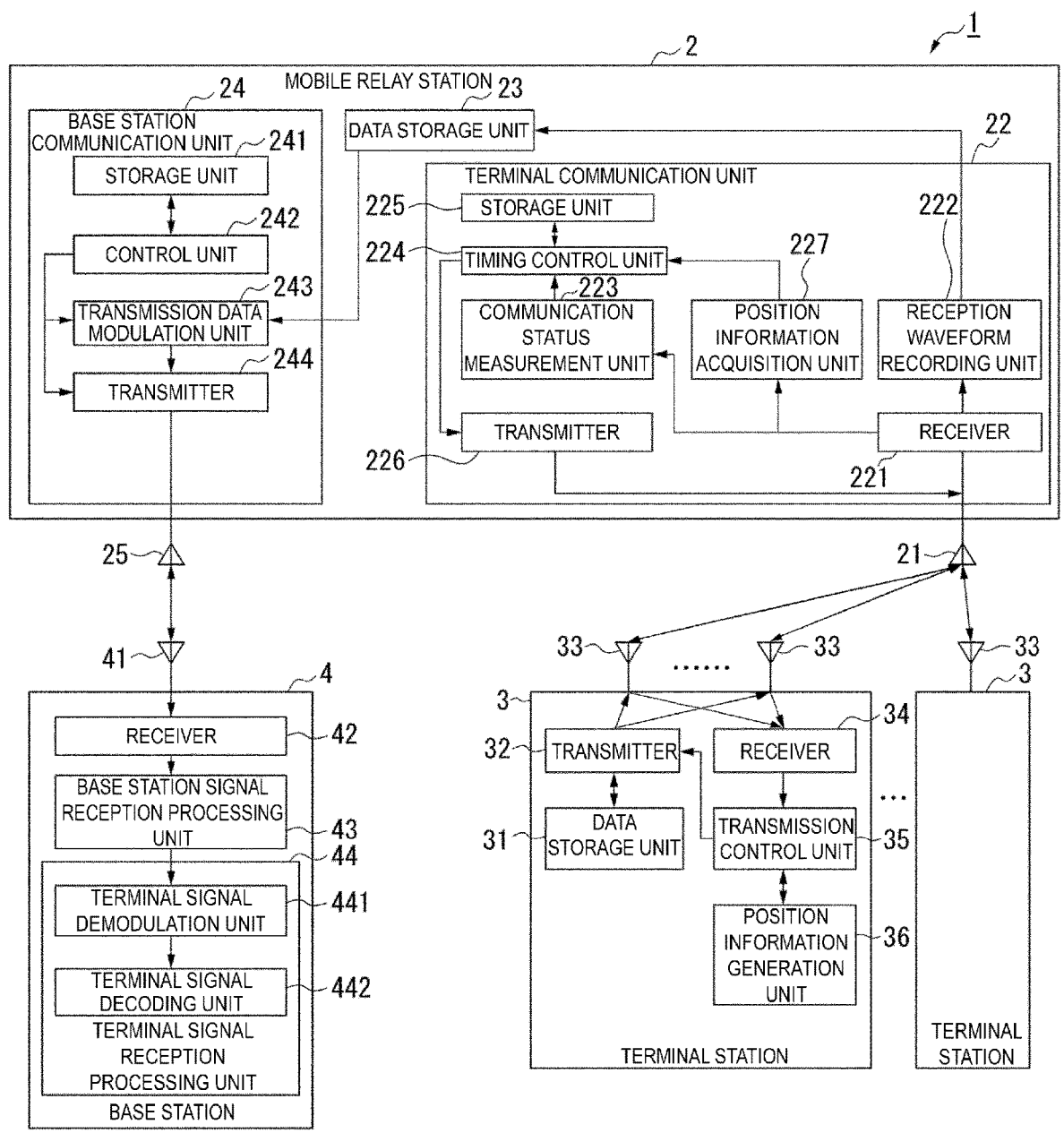
FIG. 1 is a configuration diagram of a wireless communication system according to a first embodiment of the present disclosure.

FIG. 1 is a configuration diagram of a wireless communication system 1 according to a first embodiment. The wireless communication system 1 includes a mobile relay station 2, terminal stations 3, and a base station 4. The wireless communication system 1 include an arbitrary number of mobile relay stations 2, terminal stations 3, and base stations 4, and it is assumed that a large number of terminal stations 3 are included. The wireless communication system 1 is a communication system that transmits information that does not need to be transmitted immediately. Information transmitted from each of the plurality of terminal stations 3 is transmitted via the mobile relay station 2 and collected by the base station 4.

The mobile relay station 2 is an example of a relay apparatus that is mounted in a mobile object and has a communicable area that moves with the passage of time. The mobile relay station 2 is, for example, provided in a low Earth orbit (LEO) satellite. The LEO satellite is at an altitude of 2000 km or less and orbits over the Earth at a rate of about 1.5 hours per orbiting cycle. The terminal stations 3 and the base station 4 are placed on the Earth, such as on the ground or on the sea. The plurality of terminal stations 3 are placed at different locations from each other. The terminal stations 3 are, for example, IoT terminals. The terminal stations 3 collect data such as environmental data detected by sensors and wirelessly transmit the data to the mobile relay station 2. In the same drawing, only two terminal stations 3 are illustrated. The mobile relay station 2 receives the data transmitted from each of the plurality of terminal stations 3 in wireless signals while moving over the Earth. The mobile relay station 2 accumulates the received data and wirelessly transmits the accumulated data collectively to the base station 4 at a timing when communicate with the base station 4 is possible. The base station 4 receives the data collected by the terminal stations 3 from the mobile relay station 2.

As the mobile relay station 2, it is possible to use a relay station mounted in an unmanned aerial vehicle such as a geostationary orbit satellite, a drone, and a high altitude platform station (HAPS). However, because a relay station mounted in a geostationary orbit satellite is located at a high altitude while having a wide coverage area on the ground (footprint), the link budget for the IoT terminals placed on the ground is very small. A relay station mounted in a drone or a HAPS has a high link budget and has a narrow coverage area. Furthermore, drones need batteries, and HAPSs require solar panels. In the present embodiment, the mobile relay station 2 is mounted in a LEO satellite. Thus, while keeping the link budget within a limit, the LEO satellite has no air resistance and consumes less fuel because it orbits outside the atmosphere. Furthermore, the footprint is also large as compared to the case in which the relay station is mounted in a drone or a HAPS.

The mobile relay station 2 mounted in the LEO satellite performs communication while moving at a high speed and thus has a limited time during which the terminal station 3 or the base station 4 can communicate with the mobile relay station 2. Specifically, when viewed from the ground, the mobile relay station 2 passes through the sky at intervals of approximately 10 minutes. The terminal stations 3 use wireless communication schemes with various specifications. Thus, the mobile relay station 2 receives a terminal uplink signal from the terminal stations 3 in the coverage at a current position during movement and stores waveform data of the received terminal uplink signal. The mobile relay station 2 wirelessly transmits a base station downlink signal, in which the waveform data of the terminal uplink signal has been set, to the base station 4 at the timing at which the base station 4 is placed in the coverage. The base station 4 demodulates the base station downlink signal received from the mobile relay station 2 to obtain the waveform data of the terminal uplink signal. The base station 4 demodulates and decodes the terminal uplink signal represented by the waveform data and obtains terminal transmission data transmitted by the terminal station 3.

Note that, in the wireless communication system 1 according to the present embodiment, the mobile relay station 2 and the terminal stations 3 perform wireless communication using a low power wide area (LPWA). Each terminal station 3 may be configured to transmit the same terminal uplink signal to the mobile relay station 2 multiple times to ensure communication reliability. Furthermore, it is assumed that a large number of terminal stations 3 are included as described above. With such a configuration, the communication amount of the data transmitted from the terminal stations 3 to the mobile relay station 2 may increase, and the communication bandwidth may be tight. The wireless communication system 1 according to the present embodiment controls transmission timings in transmission of data from the terminal stations 3 to the mobile relay station 2 to prevent the communication bandwidth from being tight. Control over transmission timings is performed based on the location of each terminal station 3 and the congestion level of communication.

Specifically, when each terminal station 3 transmits data such as environmental data to the mobile relay station 2, the terminal station 3 transmits a terminal uplink signal including position information indicating its position in addition to the data. Further, the terminal station 3 includes a positioning device such as a Global Positioning System (GPS) receiver, and may generate position information indicating the position of the terminal station.

The mobile relay station 2 receives the terminal uplink signal transmitted from each of the plurality of terminal stations 3, and measures the congestion level of the communication. The congestion level of the communication is a degree represented by, for example, the number of access operations of the plurality of terminal stations 3 to the mobile relay station 2 in terminal uplink communication per unit time, or a received signal strength indicator (RSSI) in the frequency band of the terminal uplink communication. In addition, the mobile relay station 2 acquires position information indicating the positions of the terminal stations 3 included in the respective terminal uplink signals. The mobile relay station 2 performs area division to divide a communication target area into a plurality of small areas based on the congestion level of the communication and the position information indicating the positions of the plurality of respective terminal stations 3.

At this time, for example, the mobile relay station 2 performs area division such that the congestion level of the communication with the terminal stations 3 included in divided small areas is made to be uniform in the plurality of small areas. Being uniform mentioned here may include frequent-use errors and does not mean that the congestion level of communication is completely equal in the plurality of small areas. Hereinafter, information for identifying each of the plurality of small areas generated by dividing the communication target area will be referred to as "area information".

The mobile relay station 2 transmits a control signal indicating that data such as environmental data has been permitted to be transmitted to the mobile relay station 2 (hereinafter, referred to as a "transmission permission signal") to the terminal stations 3 in advance. In addition, the transmission permission signal includes area information. The mobile relay station 2 transmits a terminal downlink signal in which the transmission permission signal has been set toward the ground while sequentially switching the area information included in the transmission permission signal. As a result, the mobile relay station 2 orbits over the Earth while switching between the small areas in which transmission of the terminal uplink signal to the mobile relay station 2 has been permitted over time.

The terminal stations 3 receive the transmission permission signal and checks the area information included in the transmission permission signal. The terminal stations 3 start to transmit a terminal uplink signal to the mobile relay station 2 when the positions of the terminal stations are included in the small area based on the area information. In other words, the terminal stations 3 stand by without transmitting a terminal uplink signal to the mobile relay station 2 when the positions of the terminal stations are not included in the small area based on the area information. The terminal stations 3 set position information indicating their positions in addition to the data such as environmental data as well as the terminal uplink signal to be transmitted to the mobile relay station 2. The position information is, for example, used in area division for the next orbiting of the mobile relay station 2.

Further, the terminal stations 3 may store, in advance, information in which positions indicated by longitude and latitude or the like are associated with the range of the small areas. That is, the terminal stations 3 may recognize the small areas in which their positions are included. In this case, the terminal stations 3 start to transmit the terminal uplink signals to the mobile relay station 2 when the small areas based on the area information included in the transmission permission signal match the small areas in which the positions of the terminal stations are included.

Further, in a case in which the terminal stations 3 can recognize the small areas in which their positions are included, the terminal stations 3 may set the area information indicating the small areas in which the positions are included in the terminal uplink signals to be transmitted to the mobile relay station 2, instead of setting position information indicating the positions.

The mobile relay station 2 orbits while sequentially switching the area information included in the transmission permission signal with the area information indicating the different small areas, and thus can communicate with the plurality of terminal stations 3 while making the congestion level of the communication uniform.

The details of a configuration and an operation of each apparatus in a process for controlling transmission timings based on the area information (hereinafter, referred to as a "transmission control process") in transmission of the terminal uplink signals from the terminal stations 3 to the mobile relay station 2 will be described below. First, the details of a configuration and an operation of each apparatus in a process of the base station 4 to collect data such as environmental data transmitted from each terminal station 3 via the mobile relay station 2 (hereinafter, referred to as a "data collection process") will be described below.

Data Collection Process

A configuration of each apparatus in the data collection process will be described. The mobile relay station 2 includes an antenna 21, a terminal communication unit 22, a data storage unit 23, a base station communication unit 24, and an antenna 25.

The terminal communication unit 22 includes a receiver 221 and a reception waveform recording unit 222. The receiver 221 receives a terminal uplink signal from the antenna 21. The reception waveform recording unit 222 samples the reception waveform of the terminal uplink signal received by the receiver 221 and generates waveform data indicating the value obtained from the sampling. The reception waveform recording unit 222 writes reception waveform information in which the reception time of the terminal uplink signal by the antenna 21 and the generated waveform data have been set into the data storage unit 23. The data storage unit 23 stores the reception waveform information written by the reception waveform recording unit 222.

The base station communication unit 24 transmits the reception waveform information to the base station 4 in a base station downlink signal of any wireless communication scheme. The base station communication unit 24 includes a storage unit 241, a control unit 242, a transmission data modulation unit 243, and a transmitter 244. The storage unit 241 stores a transmission start timing calculated in advance based on orbit information of the LEO satellite in which the mobile relay station 2 is mounted and the position of the base station 4. The orbit information of the LEO is information from which a position, a speed, a movement direction, and the like of the LEO satellite at a certain time can be obtained. A transmission time may be represented, for example, by a time elapsed from the transmission start timing.

The control unit 242 controls the transmission data modulation unit 243 and the transmitter 244 such that the reception waveform information is transmitted to the base station 4 at the transmission start timing stored in the storage unit 241. The transmission data modulation unit 243 reads the reception waveform information from the data storage unit 23 as transmission data and modulates the read transmission data to generate a base station downlink signal. The transmitter 244 converts the base station downlink signal from an electrical signal into a wireless signal and transmits the signal from the antenna 25.

Each terminal station 3 includes a data storage unit 31, a transmitter 32, and one or a plurality of antennas 33. The data storage unit 31 stores sensor data and the like. The transmitter 32 reads the sensor data as the terminal transmission data from the data storage unit 31 and wirelessly transmits a terminal uplink signal in which the read terminal transmission data has been set from the antennas 33.

The transmitter 32 transmits a signal using the low-power wide-area (LPWA). Although LPWA includes LoRaWAN (trade name), Sigfox (trade name), Long Term Evolution for Machines (LTE-M), and Narrow Band (NB)-IoT, and the like, any wireless communication scheme can be used. The transmitter 32 may also perform transmission with respect to another terminal station 3 using time division multiplexing, orthogonal frequency division multiplexing (OFDM), or the like.

The transmitter 32 determines a channel and a transmission timing to be used by the terminal station in transmission of the terminal uplink signal using a method predetermined in the wireless communication scheme to be used. In addition, the transmitter 32 may perform beamforming of signals transmitted from the plurality of antennas 33 using the method predetermined in the wireless communication scheme to be used.

The base station 4 includes an antenna 41, a receiver 42, a base station signal reception processing unit 43, and a terminal signal reception processing unit 44. The receiver 42 converts a base station downlink signal received by the antenna 41 to an electrical signal. The base station signal reception processing unit 43 demodulates and decodes the received signal converted by the receiver 42 into the electrical signal and obtains reception waveform information. The base station signal reception processing unit 43 outputs the reception waveform information to the terminal signal reception processing unit 44.

The terminal signal reception processing unit 44 performs a reception process of the terminal uplink signal indicated by the reception waveform information. At this time, the terminal signal reception processing unit 44 performs the reception process in the wireless communication scheme used by the terminal stations 3 in transmission to acquire the terminal transmission data. The terminal signal reception processing unit 44 includes a terminal signal demodulation unit 441 and a terminal signal decoding unit 442.

The terminal signal demodulation unit 441 demodulates the waveform data and outputs the symbol obtained from the demodulation to the terminal signal decoding unit 442. The terminal signal demodulation unit 441 may perform a process of compensating for the Doppler shift of the terminal uplink signal received by the antenna 21 of the mobile relay station 2 with respect to the signal indicated by the waveform data, and then demodulate the signal. The Doppler shift that the terminal uplink signal received by the antenna 21 receives is calculated in advance based on the positions of the terminal stations 3 and the orbit information of the LEO in which the mobile relay station 2 is mounted. The terminal signal decoding unit 442 decodes the symbols demodulated by the terminal signal demodulation unit 441 and acquires the terminal transmission data transmitted from the terminal stations 3.

An operation of the wireless communication system 1 in the data collection process will be described.

Figure 2:
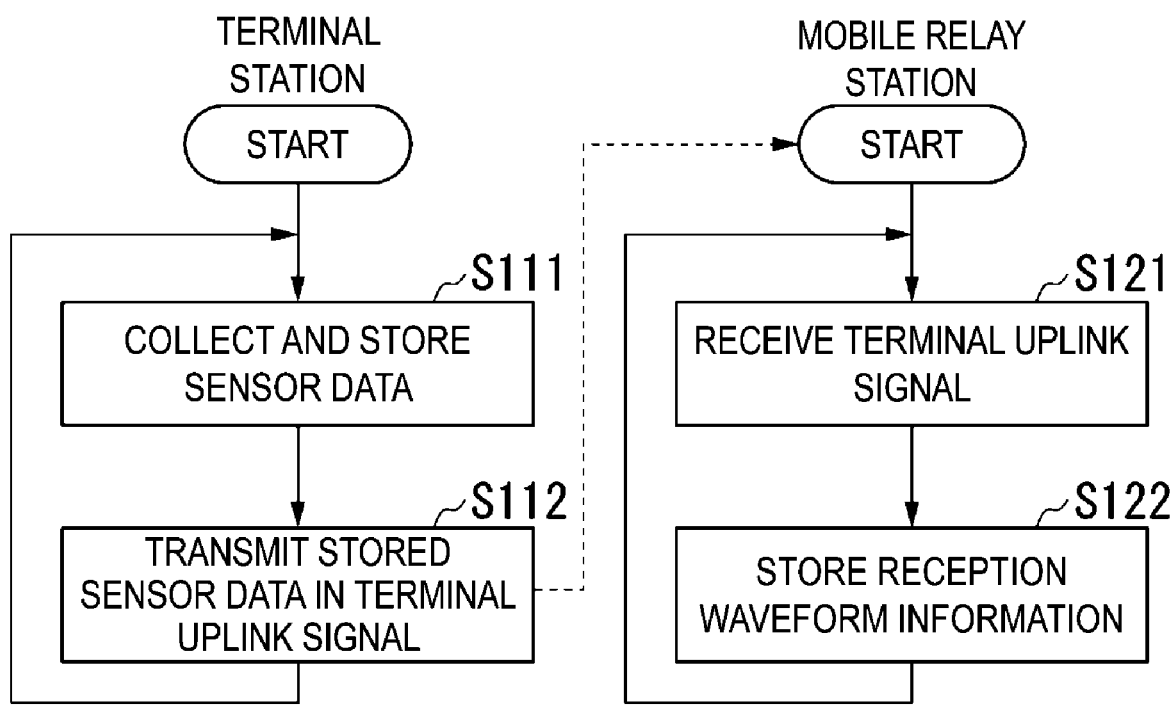
FIG. 2 is a flowchart illustrating a data collection process of the wireless communication system according to the embodiment.

FIG. 2 is a flowchart illustrating a process of the wireless communication system 1 when the terminal station 3 transmits a terminal uplink signal to the mobile relay station 2.

The terminal station 3 acquires sensor data (for example, environmental data) detected by a sensor (not illustrated) provided on the outside or inside as needed, and writes the acquired sensor data into the data storage unit 31 (step S111). The transmitter 32 reads the sensor data from the data storage unit 31 as terminal transmission data. The transmitter 32 wirelessly transmits a terminal uplink signal in which the terminal transmission data is set from the antennas 33 at a transmission start timing obtained in advance based on the orbit information of the LEO satellite in which the mobile relay station 2 is mounted (step S112). The terminal station 3 repeats the processes from step S111.

The receiver 221 of the mobile relay station 2 receives the terminal uplink signal transmitted from the terminal station 3 (step S121). According to the wireless communication scheme of the terminal station 3 serving as the transmission source, the terminal station 3 receives the terminal uplink signal from a single terminal station 3 at the same frequency in the time division manner or simultaneously receives the terminal uplink signals at the same frequency from a plurality of terminal stations 3. The reception waveform recording unit 222 writes the reception waveform information in which the waveform data representing the waveform of the terminal uplink signal received by the receiver 221 is associated with the reception time into the data storage unit 23 (step S122). The mobile relay station 2 repeats the processes from step S121.

Figure 3:
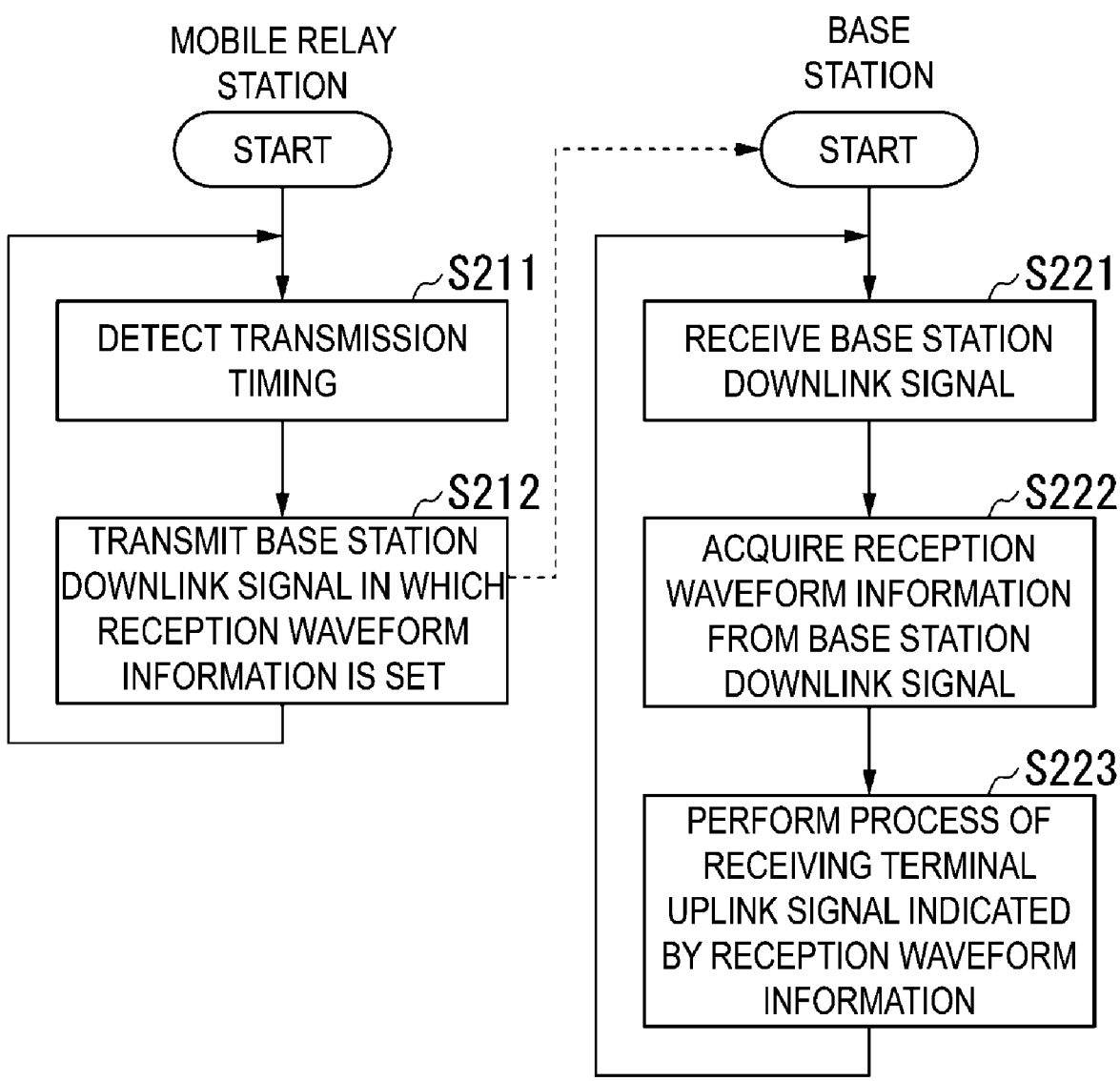
FIG. 3 is a flowchart illustrating the data collection process of the wireless communication system according to the embodiment.

FIG. 3 is a flowchart illustrating a process of the wireless communication system 1 when the mobile relay station 2 transmits a base station downlink signal to the base station 4. Upon detecting that it is a transmission start timing stored in the storage unit 241, the control unit 242 included in the base station communication unit 24 of the mobile relay station 2 instructs the transmission data modulation unit 243 and the transmitter 244 to transmit the reception waveform information (step S211). The transmission data modulation unit 243 reads the reception waveform information accumulated in the data storage unit 23 as transmission data and modulates the read transmission data to generate a base station downlink signal. The transmitter 244 wirelessly transmits the base station downlink signal generated by the transmission data modulation unit 243 from the antenna 25 (step S212). The mobile relay station 2 repeats the processes from step S211.

The antenna 41 of the base station 4 receives the base station downlink signal from the mobile relay station 2 (step S221). The receiver 42 converts the base station downlink signal received by the antenna 41 into a received electrical signal and outputs the signal to the base station signal reception processing unit 43. The base station signal reception processing unit 43 demodulates the received signal and decodes the demodulated received signal (step S222). The base station signal reception processing unit 43 outputs the reception waveform information obtained from the decoding to the terminal signal reception processing unit 44.

The terminal signal reception processing unit 44 performs a process of receiving the terminal uplink signal represented by the waveform data included in the reception waveform information (step S223). Specifically, the terminal signal demodulation unit 441 identifies the wireless communication scheme used by the terminal station 3 to transmit the terminal uplink signal based on the wireless communication scheme specific information included in the received signal represented by the waveform data. The terminal signal demodulation unit 441 demodulates the received signal represented by the waveform data according to the identified wireless communication scheme, and outputs the symbols obtained from the demodulation to the terminal signal decoding unit 442. The terminal signal decoding unit 442 decodes the symbols input from the terminal signal demodulation unit 441 in the identified wireless communication scheme, and acquires the terminal transmission data transmitted from the terminal stations 3. The terminal signal decoding unit 442 may use a decoding scheme that requires a large calculation load, such as a Successive Interference Cancellation (SIC). The base station 4 repeats the processes from step S221.

Transmission Control Process

A configuration of each apparatus in the transmission control process will be described. A configuration of the mobile relay station 2 will be described. The mobile relay station 2 further includes a communication status measurement unit 223, a timing control unit 224, a storage unit 225, a transmitter 226, and a position information acquisition unit 227 as illustrated in FIG. 1.

The communication status measurement unit 223 measures a communication status of terminal uplink communication from the plurality of terminal stations 3 for the receiver 221. The communication status measurement unit 223 generates information indicating a congestion level of communication (hereinafter, referred to as "congestion level information") based on the measurement result. For example, the communication status measurement unit 223 measures the number of access operations of the plurality of terminal stations 3 to the receiver 221 in the terminal uplink communication per unit time or measures a received signal strength in the frequency band of the terminal uplink communication to generate congestion level information.

The congestion level information may or may not be information itself indicating the number of access operations of the plurality of terminal stations 3 in the terminal uplink communication per unit time or a received signal strength in the frequency band of the terminal uplink communication. For example, the congestion level information may be information indicating a level determined based on whether the information indicating the number of access operations of the plurality of terminal stations 3 in the terminal uplink communication per unit time or a received signal strength in the frequency band of the terminal uplink communication is within the range of a predetermined threshold. That is, levels are uniquely determined in a way that, for example, level 1 is determined if the number of access operations of the plurality of terminal stations 3 in terminal uplink communication per unit time is within the range, level 2 is determined if the number of access operations is within a larger range, and level 3 is determined if the number of access operations is within an even larger range. In such a case, information in which the number of access operations and the ranges of values of the received signal strength are associated with levels is stored in advance, for example, in the storage unit 225 or the like.

The position information acquisition unit 227 acquires position information of each terminal station 3. The position information is transmitted from each terminal station 3 and included in the terminal uplink signal received by the receiver 221.

The timing control unit 224 controls the timing at which the terminal downlink signal in which a transmission permission signal has been set is to be transmitted to the terminal station 3. As described above, the transmission permission signal is a control signal indicating that the terminal station 3 has been permitted to transmit data such as environmental data to the mobile relay station 2. The timing control unit 224 acquires the congestion level information generated by the communication status measurement unit 223. In addition, the timing control unit 224 acquires the position information indicating the position of each terminal station 3 acquired by the position information acquisition unit 227.

The timing control unit 224 performs area division to divide a communication target area into a plurality of small areas based on the acquired congestion level information and position information. As described above, for example, the timing control unit 224 performs area division such that the congestion level of the communication with the terminal stations 3 included in a divided small area is made to be uniform in the plurality of small areas. The timing control unit 224 causes the storage unit 225 to store a plurality of pieces of area information generated by the area division.

The timing control unit 224 refers to the area information recorded in the storage unit 225 to generate a transmission permission signal including at least one piece of area information indicating a specific small area. The timing control unit 224 controls the timing at which the terminal downlink signal in which the transmission permission signal has been set is to be transmitted to the terminal station 3 and controls switching of the area information included in the transmission permission signal.

The transmitter 226 acquires the transmission permission signal generated by the timing control unit 224 and transmits the terminal downlink signal in which the acquired transmission permission signal has been set wirelessly from the antenna 21. The transmitter 226 transmits the signal using LPWA. LPWA may include any wireless communication scheme such as LoRaWAN (trade name), Sigfox (trade name), LTE-M, and NB-IoT. The transmitter 226 determines a channel to be used for transmission of the terminal downlink signal by the mobile relay station using a method predetermined in the wireless communication scheme being used. The timing at which the transmitter 226 transmits the terminal downlink signal is controlled by the timing control unit 224.

The storage unit 225 stores a transmission start timing for each communication target area calculated in advance based on the orbit information of the LEO satellite in which the mobile relay station 2 is mounted and the position of the communication target area. The orbit information of the LEO is information from which a position, a speed, a movement direction, and the like of the LEO satellite at a certain time can be obtained. A transmission time may be represented, for example, by a time elapsed from the transmission start timing. The timing control unit 224 controls the transmitter 226 such that the transmitter transmits the terminal downlink signal in which the transmission permission signal has been set to the station on the ground at the transmission start timing for each communication target area stored in the storage unit 225.

As described above, the mobile relay station 2 is provided, for example, in an LEO satellite that orbits over the Earth at a predetermined period. The timing control unit 224 includes, in the transmission permission signal, for example, the area information generated based on the congestion level of the communication when the terminal uplink signal was previously received from the plurality of terminal stations 3 in the communication target area (for example, the time point one orbiting cycle before). Alternatively, the timing control unit 224 may include, in the transmission permission signal, for example, the area information generated based on the congestion level of the communication when the terminal uplink signal was received from the plurality of terminal stations 3 in the communication target area in the same time slot in the past.

A configuration of the terminal station 3 will be described. The terminal station 3 further includes a receiver 34, a transmission control unit 35, and a position information generation unit 36 as illustrated in FIG. 1.

The receiver 34 receives the terminal downlink signal using the antennas 33. The transmission control unit 35 acquires the transmission permission signal from the terminal downlink signal received by the receiver 34. The transmission control unit 35 acquires the area information included in the acquired transmission permission signal.

The position information generation unit 36 includes a positioning device such as a GPS receiver, for example, to identify the position of the terminal station 3. The position information generation unit 36 generates position information indicating the identified position of the terminal station 3.

The transmission control unit 35 acquires the position information indicating the position of the terminal station 3, the position information being generated by the position information generation unit 36. The transmission control unit 35 determines whether the position of the terminal station indicated by the acquired position information is included in the small area indicated by the area information included in the transmission permission signal. The transmission control unit 35 stands by without starting to transmit the terminal uplink signal to the mobile relay station 2 when the position of the terminal station is not included in the small area.

If the position of the terminal station is included in the small area, the transmission control unit 35 causes the transmitter 32 to start to transmit the terminal uplink signal to the mobile relay station 2. At this time, the transmission control unit 35 causes the transmitter 32 to transmit the terminal uplink signal in which the position information indicating the position of the terminal station generated by the position information generation unit 36 has also been set, in addition to data such as environmental data.

The transmitter 32 transmits the terminal uplink signal. The transmitter 32 reads sensor data such as, for example, environmental data from the data storage unit 31 as terminal transmission data. The transmitter 32 wirelessly transmits, from the antennas 33, the terminal uplink signal in which the read terminal transmission data and the position information indicating the position of the terminal station generated by the position information generation unit 36 have been set. The transmitter 32 transmits the signal using LPWA.

The receiver 221 of the mobile relay station 2 receives the terminal uplink signal using the antenna 21. The reception waveform recording unit 222 samples the reception waveform of the terminal transmission data included in the terminal uplink signal received by the receiver 221 and generates waveform data indicating the value obtained from the sampling. The reception waveform recording unit 222 writes reception waveform information in which the reception time of the terminal uplink signal by the antenna 21 and the selected waveform data have been set into the data storage unit 23. The data storage unit 23 stores the reception waveform information written by the reception waveform recording unit 222.

Next, operations of the wireless communication system 1 in the transmission control process will be described.

Figure 4:
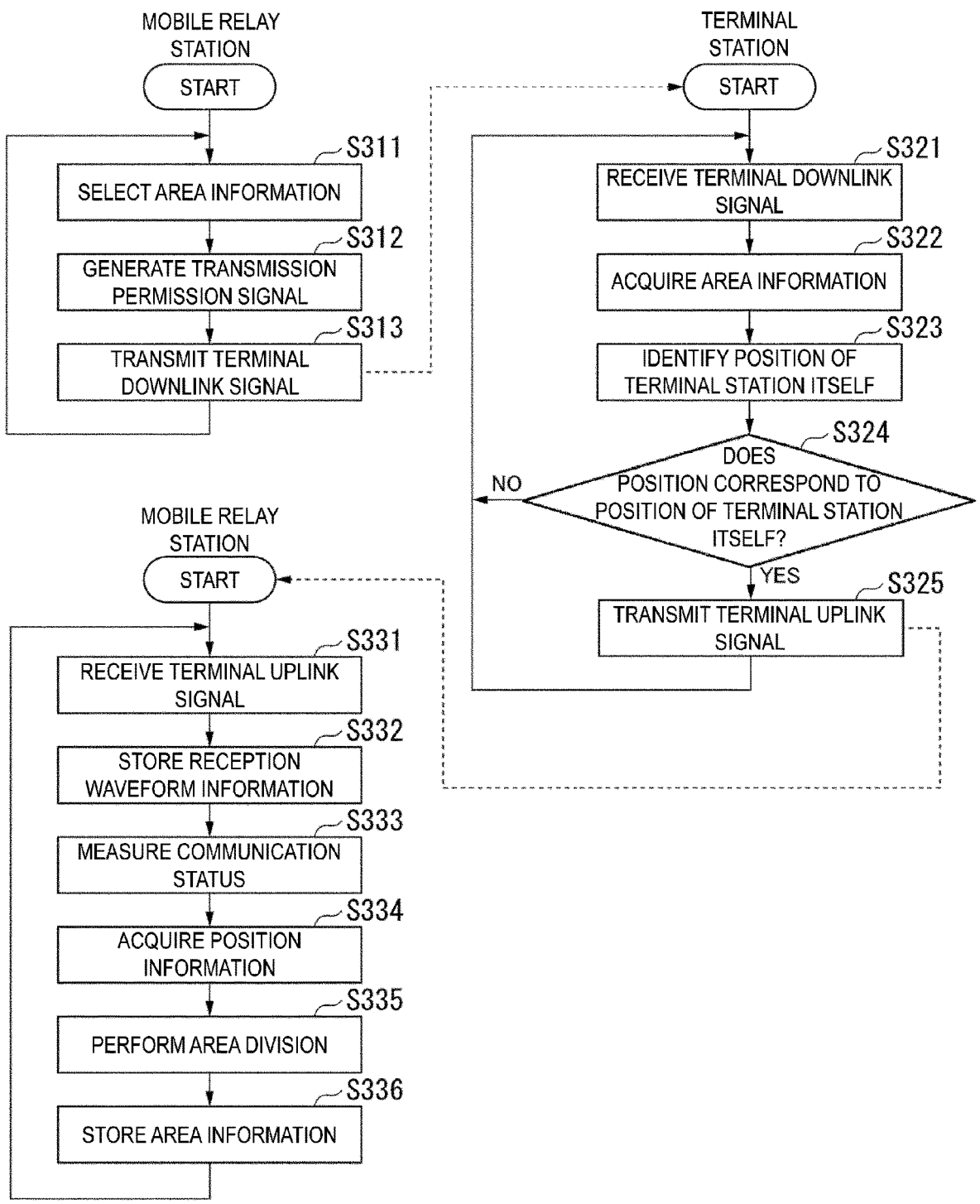
FIG. 4 is a flowchart illustrating a transmission control process of the wireless communication system according to the embodiment.

FIG. 4 is a flowchart illustrating the transmission control process in the wireless communication system 1. The timing control unit 224 of the mobile relay station 2 selects at least one piece of area information from among a plurality of pieces of area information recorded in the storage unit 225 (step S311).

The plurality of pieces of area information recorded in the storage unit 225 are, for example, area information generated based on the congestion level of the communication when the terminal uplink signal was previously received from the plurality of terminal stations 3 (for example, the time point one orbiting cycle before the orbiting of the mobile relay station 2 over the Earth). Further, the timing control unit 224 selects area information included in the transmission permission signal, for example, based on the position and the communication status of the mobile relay station.

The timing control unit 224 of the mobile relay station 2 generates a transmission permission signal including the selected area information (step S312). The transmitter 226 acquires the transmission permission signal generated by the timing control unit 224 and wirelessly transmits the terminal downlink signal in which the acquired transmission permission signal has been set from the antenna 21 (step S313). The mobile relay station 2 repeats the processes from step S311.

The receiver 34 of the terminal station 3 receives the terminal downlink signal using the antennas 33 (step S321). The transmission control unit 35 of the terminal station 3 acquires the transmission permission signal from the terminal downlink signal received by the receiver 34. The transmission control unit 35 acquires the area information included in the acquired transmission permission signal (step S322).

The position information generation unit 36 of the terminal station 3 identifies the position of the terminal station 3 (step S323). The position information generation unit 36 generates position information indicating the identified position of the terminal station 3. The transmission control unit 35 acquires the position information indicating the position of the terminal station 3, the position information being generated by the position information generation unit 36. The transmission control unit 35 determines whether the position of the terminal station indicated by the acquired position information corresponds to (or whether the position is included in) the small area indicated by the area information included in the transmission permission signal (step S324).

In a case in which the position of the terminal station does not correspond to (or is not included in) the small area (No in step S324), the transmission control unit 35 stands by without starting to transmit the terminal uplink signal to the mobile relay station 2. That is, the terminal station 3 repeats the processes from step S321.

If the position of the terminal station corresponds to (or is included in) the small area (Yes in step S324), the transmission control unit 35 causes the transmitter 32 to start to transmit the terminal uplink signal. At this time, the transmission control unit 35 causes the transmitter 32 to transmit the terminal uplink signal in which the position information indicating the position of the terminal station generated by the position information generation unit 36 has been set, in addition to data such as environmental data. The transmitter 32 transmits the terminal uplink signal (step S325). The terminal station 3 repeats the processes from step S321.

The receiver 221 of the mobile relay station 2 receives the terminal uplink signal using the antenna 21 (step S331). The reception waveform recording unit 222 of the mobile relay station 2 samples the reception waveform of the terminal uplink signal received by the receiver 221 and generates waveform data indicating the value obtained from the sampling. The reception waveform recording unit 222 writes reception waveform information in which the reception time of the terminal uplink signal by the antenna 21 and the selected waveform data have been set into the data storage unit 23. The data storage unit 23 stores the reception waveform information written by the reception waveform recording unit 222 (step S332).

The communication status measurement unit 223 of the mobile relay station 2 measures the communication status of the terminal uplink communication from the plurality of terminal stations 3 for the receiver 221 (step S333) to generate information indicating the congestion level of the communication (hereinafter, referred to as "congestion level information"). The position information acquisition unit 227 of the mobile relay station 2 acquires the position information of each terminal station 3 (step S334). The position information is transmitted from each terminal station 3 and included in the terminal uplink signal received by the receiver 221.

The timing control unit 224 performs area division to divide a communication target area into a plurality of small areas based on the acquired congestion level information and position information (step S335). As described above, for example, the mobile relay station 2 performs area division such that the congestion level of the communication with the terminal stations 3 included in the divided small areas is made to be uniform in the plurality of small areas. The timing control unit 224 causes the storage unit 225 to store a plurality of pieces of area information generated from the area division (step S336). The mobile relay station 2 repeats the processes from step S331.

As described above, according to the wireless communication system 1 according to the first embodiment, the mobile relay station 2 receives terminal uplink signals transmitted from the plurality of terminal stations 3 and measures the communication status. The mobile relay station 2 generates congestion level information based on the communication status. In addition, the mobile relay station 2 acquires position information included in the respective terminal uplink signals transmitted from the plurality of terminal stations 3. The position information is information indicating the position of each terminal station 3. The mobile relay station 2 performs area division to divide a communication target area into a plurality of small areas based on the congestion level information and position information.

The mobile relay station 2 permits each terminal station 3 present in the small area divided by the area division to transmit the terminal uplink signal in the following orbiting times. In other words, the mobile relay station 2 sets, in the terminal uplink signal, a transmission permission signal including the area information indicating the small area for which the terminal stations 3 are permitted for transmission of the terminal downlink signal. The mobile relay station 2 transmits the terminal downlink signal in which the transmission permission signal including the area information has been set toward the ground.

Each terminal station 3 acquires the transmission permission signal indicated by the received terminal downlink signal and acquires the area information included in the transmission permission signal. The terminal station 3 identifies its position using, for example, a positioning device. The terminal station 3 starts to transmit a terminal uplink signal to the mobile relay station 2 when its position is included in the small area indicated by the acquired area information. At this time, the terminal station 3 transmits, to the mobile relay station 2, the terminal uplink signal in which data such as environmental data and position information indicating the position of the terminal station 3 have been set.

With this configuration, the wireless communication system 1 can control the transmission timing of the terminal uplink signal from the terminal station 3 to the mobile relay station 2 for each small area. The wireless communication system 1 performs area division in which the communication target area is divided into a plurality of small areas, for example, to make the congestion level of communication uniform. As a result, the wireless communication system 1 can adjust to make the congestion level of the communication uniform even when the congestion level of the communication varies, and thus sensor data transmitted from a large number of terminal stations 3 can be transmitted to the base station 4 via the mobile relay station 2 while preventing a decrease in communication reliability.

Further, the area information indicating the small area may be information indicating the range indicated by the latitude and longitude, for example. Alternatively, the area information indicating the small area may be index information for identifying the small area divided into a predetermined section based on the latitude and longitude, for example. In this case, information indicating a range of the latitude and longitude corresponding to each index information needs to be shared between the mobile relay station 2 and the terminal stations 3.

Note that, if the small area includes the position of the terminal station based on the acquired area information, the transmission control unit 35 of the terminal station 3 causes the transmitter 32 to start to transmit the terminal uplink signal as described above. At this time, the transmission control unit 35 may not immediately start to transmit the terminal uplink signal, and may start the transmission of the terminal uplink signal at a timing when a random time has elapsed from the acquisition of the area information. As a result, it is possible to avoid simultaneously starting transmission of terminal uplink signals to the mobile relay station 2 by the plurality of terminal stations 3 located in the same small area. Thus, the congestion level of communication to the mobile relay station 2 can be reduced.

First Modified Example of First Embodiment

In the present modified example, the mobile relay station transmits a base station downlink signal using a plurality of antennas. A difference from the first embodiment in a case in which Multiple-Input Multiple-Output (MIMO) is used in transmission of a base station downlink signal will be mainly described below.

Figure 5:
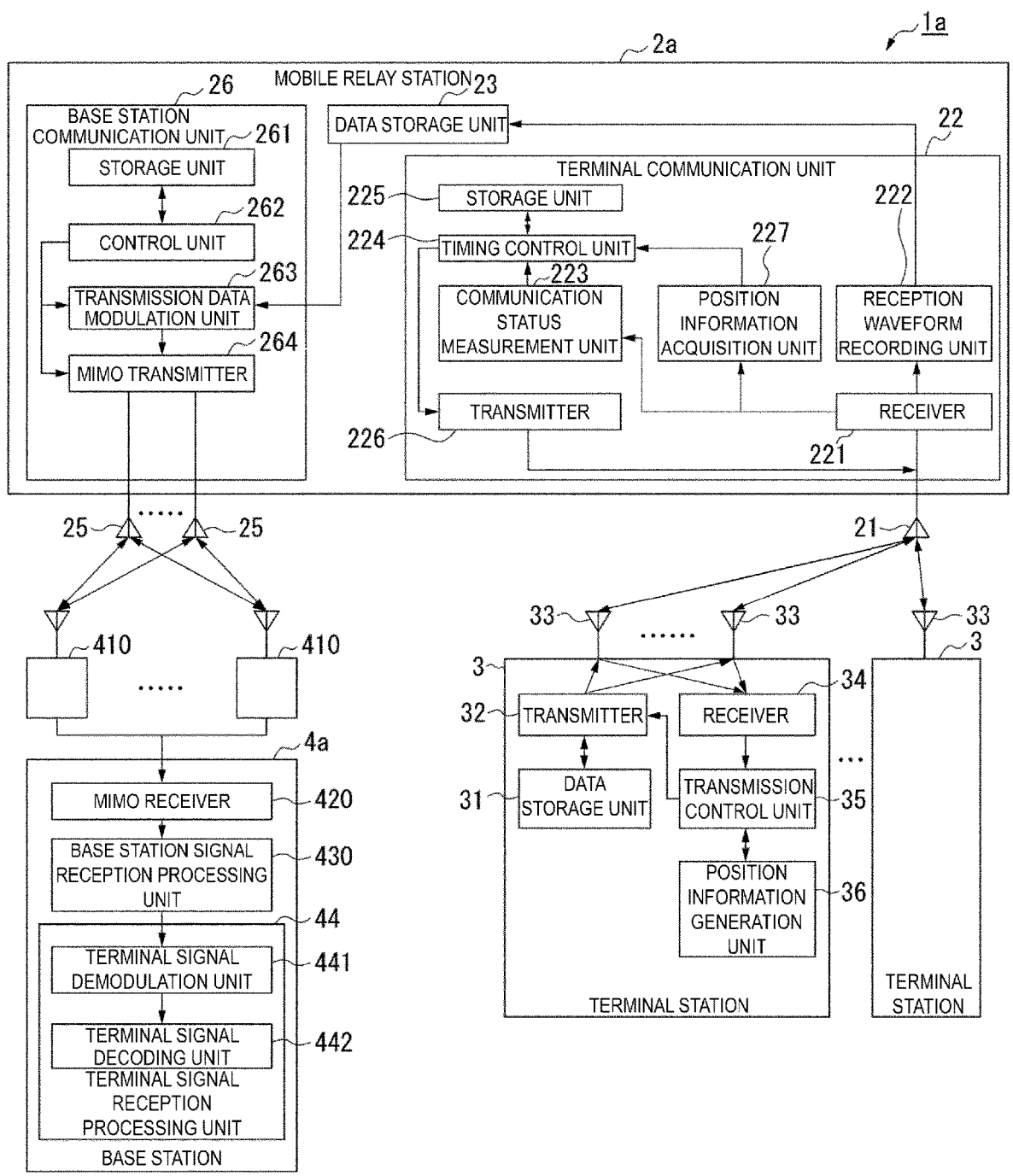
FIG. 5 is a configuration diagram of a wireless communication system according to a first modified example of the first embodiment of the present disclosure.

FIG. 5 is a configuration diagram of a wireless communication system 1a according to a first modified example of the first embodiment. In the diagram, the same constituent components as those of the wireless communication system 1 according to the first embodiment illustrated in FIG. 1 are denoted by the same reference signs, and descriptions thereof will be omitted. The wireless communication system 1a includes a mobile relay station 2a, terminal stations 3, and a base station 4a.

The mobile relay station 2a includes an antenna 21, a terminal communication unit 22, a data storage unit 23, a base station communication unit 26, and a plurality of antennas 25. The base station communication unit 26 transmits reception waveform information to the base station 4a using MIMO. The base station communication unit 26 includes a storage unit 261, a control unit 262, a transmission data modulation unit 263, and a MIMO transmitter 264. The storage unit 261 stores a transmission start timing calculated in advance based on orbit information of a LEO satellite in which the mobile relay station 2a is mounted and the position of the base station 4a. Furthermore, the storage unit 261 stores a weight of each transmission time of a base station downlink signal transmitted from each antenna 25 in advance. The weight of each transmission time is calculated based on the orbit information of the LEO satellite and the position of each antenna station 410 provided in the base station 4a. Further, a constant weight may be used regardless of a transmission time.

The control unit 262 controls the transmission data modulation unit 263 and the MIMO transmitter 264 such that the reception waveform information is transmitted to the base station 4a at the transmission start timing stored in the storage unit 261. Furthermore, the control unit 262 instructs the MIMO transmitter 264 with a weight per transmission time read from the storage unit 261. The transmission data modulation unit 263 reads the reception waveform information from the data storage unit 23 as transmission data, and the read transmission data is converted into a parallel signal and then modulated. The MIMO transmitter 264 weights the modulated parallel signal using the weight indicated by the control unit 262 to generate a base station downlink signal transmitted from each antenna 25. The MIMO transmitter 264 transmits the generated base station downlink signal from the antenna 25 using MIMO.

The base station 4a includes a plurality of antenna stations 410, a MIMO receiver 420, a base station signal reception processing unit 430, and a terminal signal reception processing unit 44. The antenna stations 410 are disposed such that one antenna station is positioned away from another antenna station 410 to have a large difference in angle at which signals from each of the plurality of antennas 25 of the mobile relay station 2a arrive. Each antenna station 410 converts the base station downlink signal received from the mobile relay station 2a into an electrical signal and outputs the signal to the MIMO receiver 420.

The MIMO receiver 420 aggregates base station downlink signals received from the plurality of antenna stations 410. The MIMO receiver 420 stores weights on the base station downlink signals received by each antenna station 410 at each reception time based on the orbit information of the LEO satellite and the position of each antenna station 410. The MIMO receiver 420 multiplies the base station downlink signal input from each antenna station 410 by a weight corresponding to the reception time of the base station downlink signal and combines the received signals that have been multiplied by the weights. The same weight may be used regardless of the reception time. The base station signal reception processing unit 430 demodulates and decodes the combined received signals and obtains reception waveform information. The base station signal reception processing unit 430 outputs the reception waveform information to the terminal signal reception processing unit 44.

An operation of the wireless communication system 1a will be described. The processing of the wireless communication system 1a when a terminal uplink signal is transmitted from the terminal station 3 is the same as the processing of the wireless communication system 1 of the first embodiment illustrated in FIG. 2.

Figure 6:
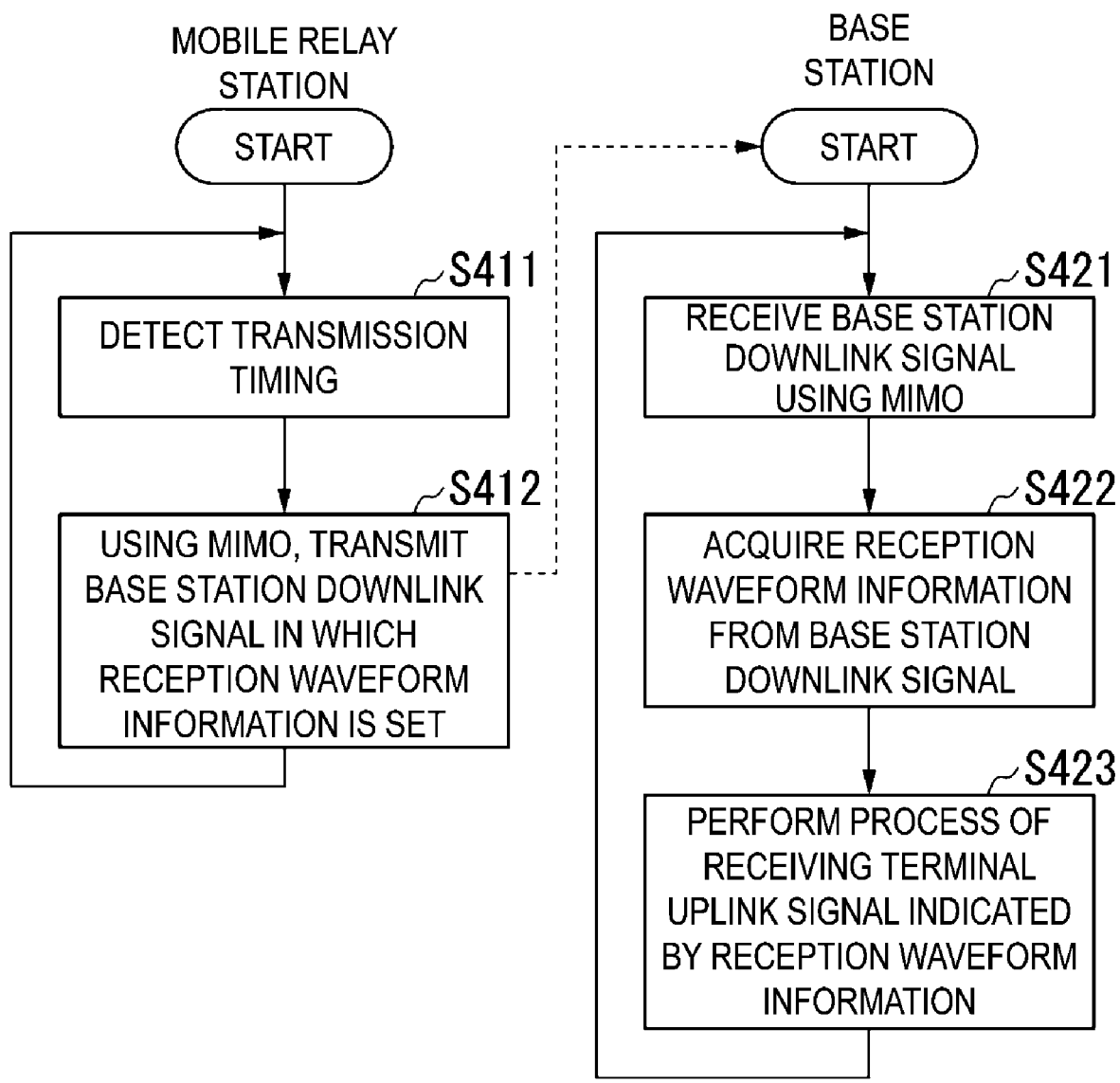
FIG. 6 is a flowchart illustrating a data collection process of the wireless communication system according to the modified example.

FIG. 6 is a flowchart illustrating a process of the wireless communication system 1a when the mobile relay station 2a transmits a base station downlink signal. Upon detecting that it is a transmission start timing stored in the storage unit 261, the control unit 262 included in the base station communication unit 26 of the mobile relay station 2a instructs the transmission data modulation unit 263 and the MIMO transmitter 264 to transmit the reception waveform information (step S411). The transmission data modulation unit 263 reads the reception waveform information accumulated in the data storage unit 23 as transmission data. The read transmission data is parallel converted and then modulated. The MIMO transmitter 264 weights the transmission data modulated by the transmission data modulation unit 263 using a weight indicated by the control unit 262 to generate a base station downlink signal that is a transmission signal to be transmitted from each antenna 25. The MIMO transmitter 264 transmits the generated base station downlink signal from the antenna 25 using MIMO (step S412). The mobile relay station 2a repeats the processes from step S411.

Each antenna station 410 of the base station 4a receives the base station downlink signal from the mobile relay station 2a (step S421). Each antenna station 410 outputs the received signal obtained by converting the received base station downlink signal into an electrical signal to the MIMO receiver 420. The MIMO receiver 420 synchronizes the timings of the signals received by the antenna stations 410. The MIMO receiver 420 multiplies and adds the signals received by the antenna station 410 by a weight. The base station signal reception processing unit 430 demodulates the received signals added and decodes the demodulated received signals (step S422). The base station signal reception processing unit 430 outputs the reception waveform information obtained from the decoding to the terminal signal reception processing unit 44.

The terminal signal reception processing unit 44 performs a process of receiving the terminal uplink signal represented by the waveform data included in the reception waveform information through the same process as step S223 in the processing flow of the first embodiment illustrated in FIG. 3 (step S423). That is, the terminal signal demodulation unit 441 identifies the wireless communication scheme used by the terminal station 3 to transmit the terminal uplink signal based on the wireless communication scheme specific information included in the received signals represented by the waveform data. The terminal signal demodulation unit 441 demodulates the received signals represented by the waveform data according to the identified wireless communication scheme, and outputs the symbols obtained from the demodulation to the terminal signal decoding unit 442. The terminal signal decoding unit 442 decodes the symbols input from the terminal signal demodulation unit 441 in the identified wireless communication scheme, and acquires the terminal transmission data transmitted from the terminal stations 3. Further, the terminal signal decoding unit 442 may use a decoding scheme that requires a large calculation load, such as SIC. The base station 4a repeats the processes from step S421.

In the wireless communication system 1a according to the present modified example, the mobile relay station 2a can collectively transmit data that has been received from the plurality of terminal stations 3 and accumulated, at a timing at which the mobile relay station 2a can communicate with the base station 4a with high quality for a short period of time.

Second Modified Example of First Embodiment

In the present modified example, a mobile relay station receives a terminal uplink signal using a plurality of antennas and transmits a terminal downlink signal using the plurality of antennas. Hereinafter, differences from the first modified example of the first embodiment will be mainly described.

Figure 7:
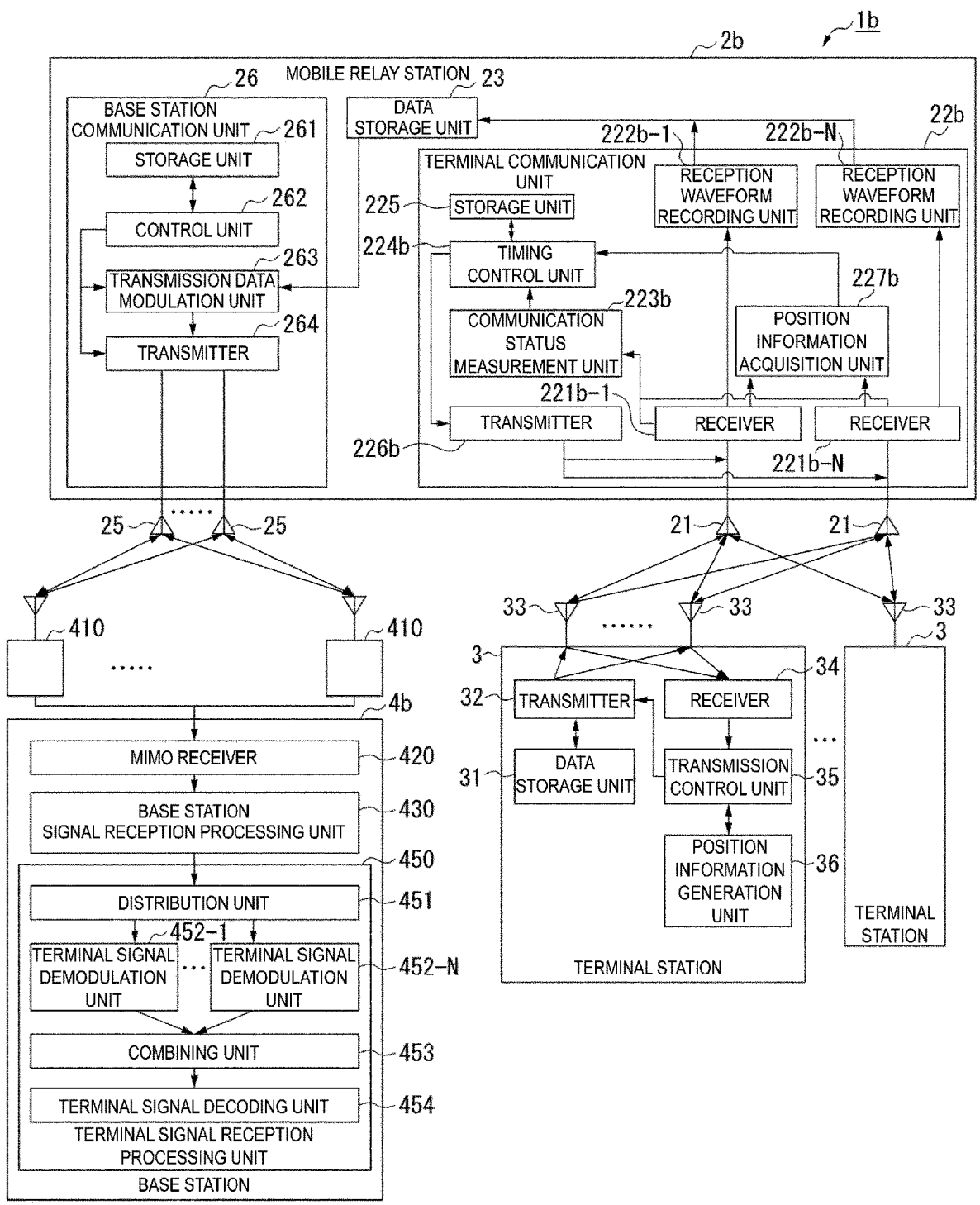
FIG. 7 is a configuration diagram of a wireless communication system according to a second modified example of the first embodiment of the present disclosure.

FIG. 7 is a configuration diagram of a wireless communication system 1b according to a second modified example of the first embodiment. In the diagram, the same constituent components as those of the wireless communication system 1a according to the first modified example of the first embodiment illustrated in FIG. 5 are denoted by the same reference signs, and descriptions thereof will be omitted. The wireless communication system 1b includes a mobile relay station 2b, terminal stations 3, and a base station 4b.

The mobile relay station 2b includes N pieces of antennas 21 (N is an integer equal to or greater than 2), a terminal communication unit 22b, a data storage unit 23, a base station communication unit 26, and a plurality of antennas 25. The N pieces of antennas 21 will be denoted by antennas 21-1 to 21-N.

The terminal communication unit 22b includes N pieces of receivers 221b and N pieces of reception waveform recording units 222b. The N pieces of receivers 221b will be denoted by receivers 221b-1 to 221b-N, and the N pieces of reception waveform recording units 222b will be denoted by reception waveform recording units 222b-1 to 222b-N. The receiver 221b-n (n is an integer greater than or equal to 1 and equal to or smaller than N) receives a terminal uplink signal using the antenna 21-*n*. The reception waveform recording unit 222*b*-*n* samples the reception waveform of the terminal uplink signal received by the receiver 221*b*-*n* and generates waveform data indicating the value obtained from the sampling. The reception waveform recording unit 222*b*-*n* writes, into the data storage unit 23, reception waveform information in which the antenna identifier of the antenna 21-*n*, the reception time of the terminal uplink signal in the antenna 21-*n*, and the generated waveform data are set. The antenna identifier is information for identifying the antenna 21-*n*. The data storage unit 23 stores the reception waveform information including the waveform data of the terminal uplink signals received by each of the antennas 21-1 to 21-N.

The base station 4*b* includes a plurality of antenna stations 410, a MIMO receiver 420, a base station signal reception processing unit 430, and a terminal signal reception processing unit 450.

The terminal signal reception processing unit 450 performs a reception process of the terminal uplink signals indicated by the reception waveform information. At this time, the terminal signal reception processing unit 450 performs the reception process in the wireless communication scheme used by the terminal stations 3 in the transmission to acquire the terminal transmission data. The terminal signal reception processing unit 450 includes a distribution unit 451, N pieces of terminal signal demodulation units 452, a combining unit 453, and a terminal signal decoding unit 454. The N pieces of terminal signal demodulation units 452 each are denoted by terminal signal demodulation units 452-1 to 452-N.

The distribution unit 451 reads waveform data of the same reception time from reception waveform information and outputs the read waveform data to the terminal signal demodulation units 452-1 to 452-N according to the antenna identifier associated with the waveform data. That is, the distribution unit 451 outputs the waveform data associated with the antenna identifier of the antenna 21-*n* to the terminal signal demodulation unit 452-*n*. Each of the terminal signal demodulation units 452-1 to 452-N demodulates signals represented by the waveform data and outputs the symbols obtained from the demodulation to the combining unit 453. The terminal signal demodulation unit 452-*n* may perform a process of compensating for the Doppler shift of the terminal uplink signal received by the antenna 21-*n* of the mobile relay station 2 with respect to the signals represented by the waveform data, and then demodulate the signals. The Doppler shift that the terminal uplink signal received by each antenna 21-*n* receives is calculated in advance based on the positions of the terminal stations 3 and the orbit information of the LEO in which the mobile relay station 2*b* is mounted. The combining unit 453 additively combines the symbols input from each of the terminal signal demodulation units 452-1 to 452-N and outputs the symbols input to the terminal signal decoding unit 454. The terminal signal decoding unit 454 decodes the additively combined symbols to obtain the terminal transmission data transmitted from the terminal stations 3.

In addition, the mobile relay station 2*b* further includes a communication status measurement unit 223*b*, a timing control unit 224*b*, a storage unit 225, a transmitter 226*b*, and a position information acquisition unit 227*b* as illustrated in FIG. 7.

The communication status measurement unit 223*b* measures a communication status of terminal uplink communication from the plurality of terminal stations 3 in the receivers 221*b*-1 to 221*b*-N. The communication status measurement unit 223*b* generates information indicating a congestion level of communication (congestion level information) based on the measurement result. For example, the communication status measurement unit 223*b* measures the number of access operations of the plurality of terminal stations 3 to the receivers 221*b*-1 to 221*b*-N in the terminal uplink communication per unit time or measures a received signal strength in the frequency band of the terminal uplink communication to generate congestion level information.

The congestion level information may or may not be information itself indicating the number of access operations of the plurality of terminal stations 3 in the terminal uplink communication per unit time or a received signal strength in the frequency band of the terminal uplink communication. For example, the congestion level information may be information indicating a level determined based on whether the information indicating the number of access operations of the plurality of terminal stations 3 in the terminal uplink communication per unit time or a received signal strength in the frequency band of the terminal uplink communication is within the range of a predetermined threshold. In such a case, information in which the number of access operations and the ranges of values of the received signal strength are associated with levels is stored in advance, for example, in the storage unit 225 or the like.

The position information acquisition unit 227*b* acquires position information of each terminal station 3. The position information is transmitted from each of the terminal stations 3 and included in the terminal uplink signals received by the receivers 221*b*-1 to 221*b*-N.

The timing control unit 224*b* controls the timings at which the terminal downlink signals in which a transmission permission signal has been set is to be transmitted to the terminal stations 3. The timing control unit 224*b* acquires the congestion level information generated by the communication status measurement unit 223*b*. In addition, the timing control unit 224*b* acquires the position information indicating the position of each terminal station 3 acquired by the position information acquisition unit 227*b*.

The timing control unit 224*b* performs area division to divide a communication target area into a plurality of small areas based on the acquired congestion level information and position information. For example, the mobile relay station 2*b* performs area division such that the congestion level of the communication with the terminal stations 3 included in divided small areas is made to be uniform in the plurality of small areas. The timing control unit 224*b* causes a plurality of pieces of area information generated from the area division to be stored in the storage unit 225.

The timing control unit 224*b* refers to the area information recorded in the storage unit 225 to generate a transmission permission signal including at least one piece of area information indicating a specific small area. The timing control unit 224*b* controls the timings at which the terminal downlink signals in which the transmission permission signal including the area information has been set is to be transmitted to the terminal stations 3 and controls switching of the area information included in the transmission permission signals.

The transmitter 226*b* acquires the transmission permission signals generated by the timing control unit 224*b*, and transmits the terminal downlink signals in which the acquired transmission permission signals have been set wirelessly from the plurality of antennas 21. The transmitter 226*b* transmits the signals using LPWA. The transmitter 226*b* determines a channel to be used for transmission of the terminal downlink signals by the mobile relay station using a method predetermined in the wireless communication scheme being used. The timings at which the transmitter 226b transmits the terminal downlink signals are controlled by the timing control unit 224b.

The storage unit 225 stores a transmission start timing for each communication target area calculated in advance based on the orbit information of the LEO satellite in which the mobile relay station 2b is mounted and the position of the communication target area. The timing control unit 224b controls the transmitter 226b such that the transmitter transmits the terminal downlink signals in which the transmission permission signals have been set to the stations on the ground at the transmission start timing for each communication target area stored in the storage unit 225.

The timing control unit 224b includes, in the transmission permission signals, for example, the area information generated based on the congestion level of the communication when the terminal uplink signals were previously received from the plurality of terminal stations 3 in the communication target area (for example, the time point one orbiting cycle before). Alternatively, the timing control unit 224b may include, in the transmission permission signals, for example, the area information generated based on the congestion level of the communication when the terminal uplink signals were received from the plurality of terminal stations 3 in the communication target area in the same time slot in the past.

In addition, the terminal station 3 further includes a receiver 34, a transmission control unit 35, and a position information generation unit 36 as illustrated in FIG. 7. The receiver 34 receives the terminal downlink signal using the antennas 33. The transmission control unit 35 acquires the transmission permission signal from the terminal downlink signal received by the receiver 34. The transmission control unit 35 acquires the area information included in the acquired transmission permission signal.

The position information generation unit 36 includes a positioning device such as a GPS receiver, for example, to identify the position of the terminal station. The position information generation unit 36 generates position information indicating the identified position of the terminal station 3.

The transmission control unit 35 acquires the position information indicating the position of the terminal station 3, the position information being generated by the position information generation unit 36. The transmission control unit 35 determines whether the position of the terminal station indicated by the acquired position information is included in the small area indicated by the area information included in the transmission permission signal. The transmission control unit 35 stands by without starting to transmit the terminal uplink signal to the mobile relay station 2b when the position of the terminal station 3 is not included in the small area.

If the position of the terminal station is included in the small area, the transmission control unit 35 causes the transmitter 32 to start to transmit the terminal uplink signal. At this time, the transmission control unit 35 causes the transmitter 32 to transmit the terminal uplink signal in which the position information indicating the position of the terminal station generated by the position information generation unit 36 has been set, in addition to data such as environmental data.

The transmitter 32 transmits the terminal uplink signal. The transmitter 32 reads sensor data such as, for example, environmental data from the data storage unit 31 as terminal transmission data. The transmitter 32 wirelessly transmits, from the antennas 33, the terminal uplink signal in which the read terminal transmission data and the position information indicating the position of the terminal station generated by the position information generation unit 36 have been set. The transmitter 32 transmits the signal using LPWA.

The receivers 221b-1 to 221b-N of the mobile relay station 2b receive the terminal uplink signals using the antennas 21-1 to 21-N. The reception waveform recording units 222b-1 to 222b-N sample the reception waveforms of the terminal uplink signals received by the receivers 221b-1 to 221b-n and generates waveform data indicating the value obtained from the sampling. The reception waveform recording unit 222b-1 to 222b-N write reception waveform information in which the reception times of the terminal uplink signals by the antennas 21-1 to 21-N and the selected waveform data have been set into the data storage unit 23. The data storage unit 23 stores the reception waveform information written by the reception waveform recording units 222b-1 to 222b-N.

Figure 8:
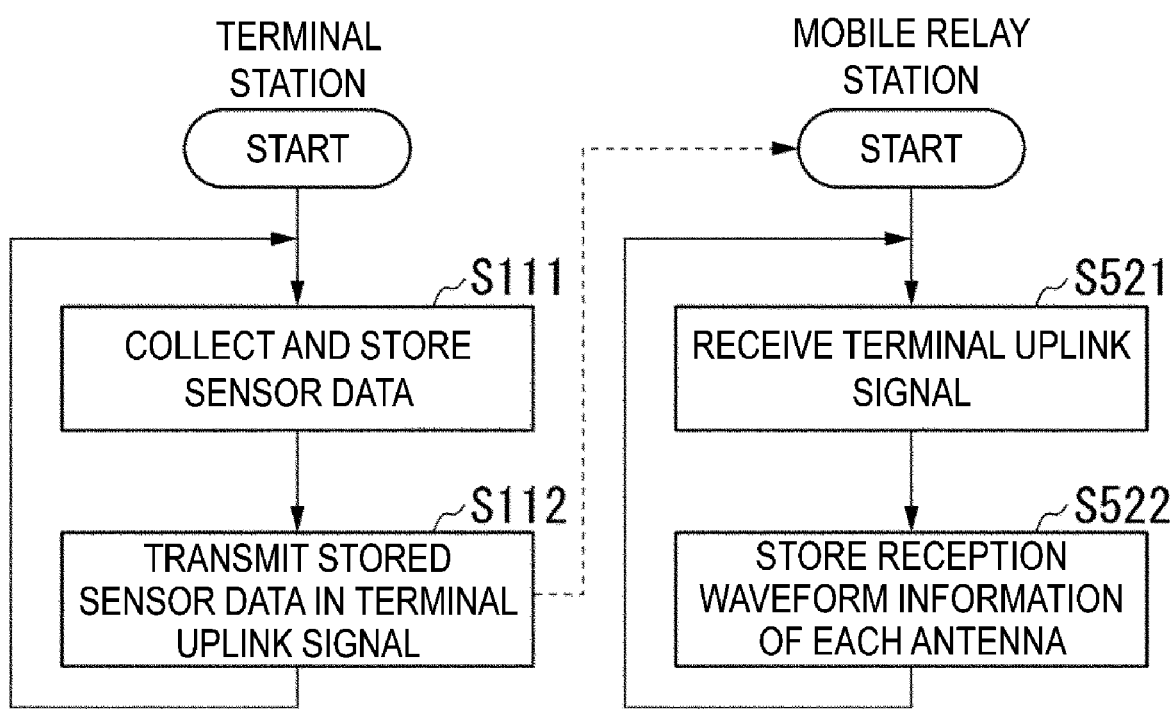
FIG. 8 is a flowchart illustrating a data collection process of the wireless communication system according to the modified example.

An operation of the wireless communication system 1b will be described. FIG. 8 is a flowchart illustrating a process of the wireless communication system 1b when the terminal station 3 transmits a terminal uplink signal to the mobile relay station 2b. In the diagram, the same processes as those in the processing flow for the first embodiment illustrated in FIG. 2 are denoted by the same reference signs. The terminal station 3 performs the same processes similar to those in steps S111 and S112 in the processing flow for the first embodiment illustrated in FIG. 2. Further, the terminal station 3 may perform transmission with the other terminal station 3 using time division multiplexing, OFDM, MIMO, or the like.

The receivers 221b-1 to 221b-N of the mobile relay station 2b receive terminal uplink signals transmitted from the terminal station 3 (step S521). According to the wireless communication scheme of the terminal station 3 serving as the transmission source, the terminal station 3 receives the terminal uplink signal from a single terminal station 3 at the same frequency in the time division manner or simultaneously receives the terminal uplink signals at the same frequency from a plurality of terminal stations 3. The reception waveform recording unit 222b-n writes the reception waveform information in which the waveform data representing the waveform of the terminal uplink signal received by the receiver 221b-n, the reception time, and the antenna identifier of the antenna 21-n are associated to the data storage unit 23 (step S522). The mobile relay station 2b repeats the processes from step S521.

The process of the wireless communication system 1b when the mobile relay station 2b transmits a base station downlink signal from to the base station 4 is similar to that in the processing flow for the first modified example of the first embodiment illustrated in FIG. 6, except the following processes. In other words, in step S423, the terminal signal reception processing unit 450 performs a process of receiving the terminal uplink signal indicated by the reception waveform information. Specifically, the distribution unit 451 reads waveform data of the same reception time from the reception waveform information and outputs the read waveform data to the terminal signal demodulation units 452-1 to 452-N according to the antenna identifiers associated with the waveform data. The terminal signal demodulation units 452-1 to 452-N identify the wireless communication scheme used by the terminal station 3 to transmit the terminal uplink signal based on the wireless communication scheme specific information included in the received signals indicated by the waveform data. The terminal signal demodulation units 452-1 to 452-N demodulate the received signals represented by the waveform data according to the identified wireless communication scheme, and output the symbols obtained from the demodulation to the combining unit 453.

The combining unit 453 additively combines the symbols input from each of the terminal signal demodulation units 452-1 to 452-N. Although the signals transmitted by the terminal station 3 are emphasized due to the additive combination because they are correlated, the effect of randomly added noise is reduced. Thus, a diversity effect with respect to terminal uplink signals that the mobile relay station 2b receives only from one terminal station 3 at the same time is obtained. Simultaneously receiving terminal uplink signals by the mobile relay station 2b from the plurality of terminal stations 3 corresponds to performing MIMO communication. The combining unit 453 outputs the additively combined symbols to the terminal signal decoding unit 454. The terminal signal decoding unit 454 decodes the symbols additively combined by the combining unit 453 in the identified wireless communication scheme to obtain the terminal transmission data transmitted from the terminal stations 3. Further, the terminal signal decoding unit 454 may use a decoding scheme that requires a large calculation load, such as SIC.

Figure 9:
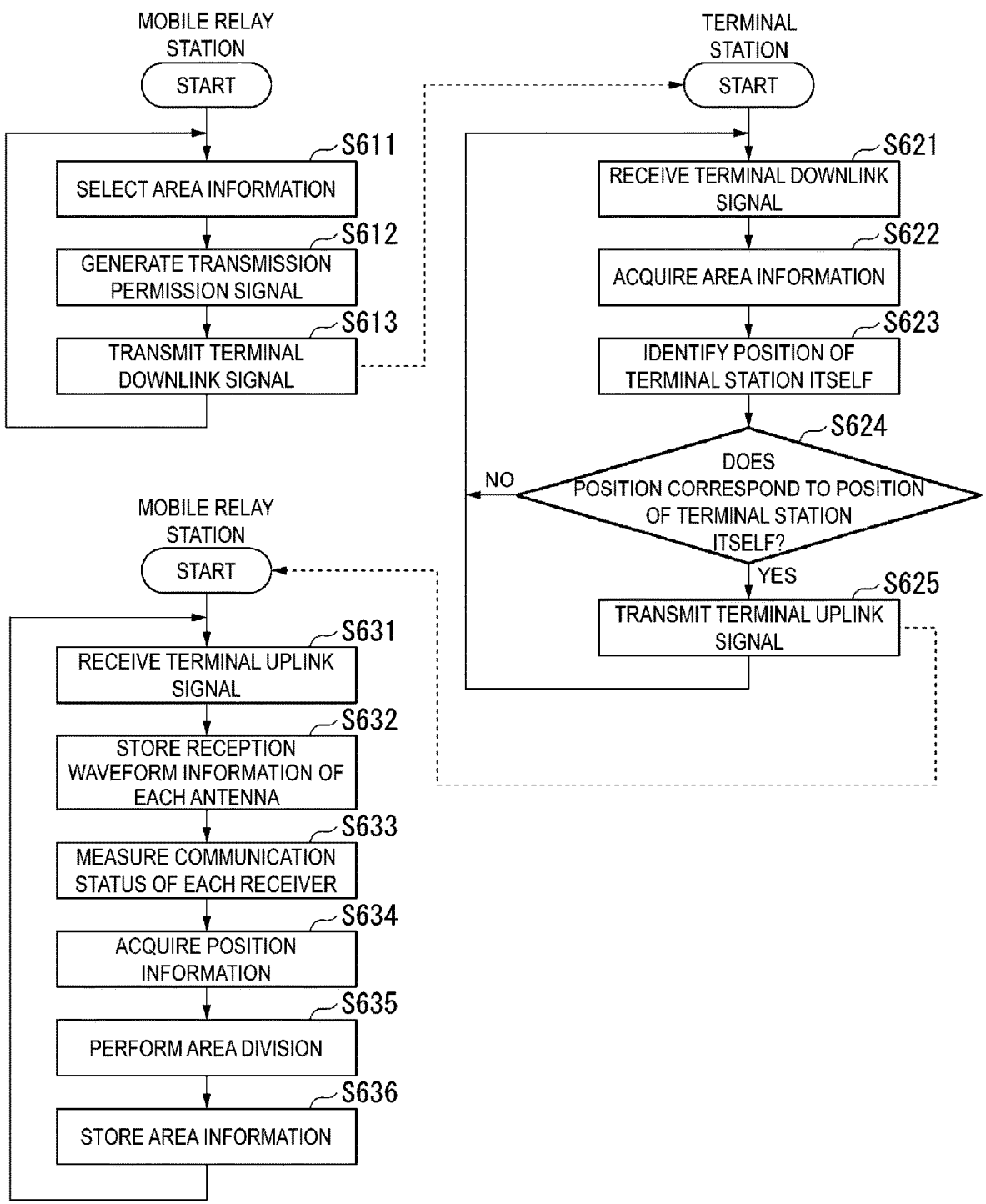
FIG. 9 is a flowchart showing a transmission control process of the wireless communication system according to the modified example.

FIG. 9 is a flowchart illustrating a transmission control process in the wireless communication system 1b. The timing control unit 224b of the mobile relay station 2b selects at least one piece of area information from among a plurality of pieces of area information recorded in the storage unit 225 (step S611).

The plurality of pieces of area information recorded in the storage unit 225 are, for example, area information generated based on the congestion level of the communication when the terminal uplink signal was previously received from the plurality of terminal stations 3 (for example, the time point one orbiting cycle before the orbiting of the mobile relay station 2b over the Earth). Further, the timing control unit 224b selects area information included in the transmission permission signal, for example, based on the position and the communication status of the mobile relay station.

The timing control unit 224b of the mobile relay station 2b generates a transmission permission signal including the selected area information (step S612). Further, the transmitter 226b acquires the transmission permission signal generated by the timing control unit 224b, and wirelessly transmits the terminal downlink signal in which the acquired transmission permission signal has been set from the antennas 21-1 to 21-N (step S613). The mobile relay station 2b repeats the processes from step S611.

The receiver 34 of the terminal station 3 receives the terminal downlink signal using the antennas 33 (step S621). The transmission control unit 35 of the terminal station 3 acquires the transmission permission signal from the terminal downlink signal received by the receiver 34. The transmission control unit 35 acquires the area information included in the acquired transmission permission signal (step S622).

The position information generation unit 36 of the terminal station 3 identifies the position of the terminal station (step S623). The position information generation unit 36 generates position information indicating the identified position of the terminal station. The transmission control unit 35 acquires the position information indicating the position of the terminal station 3, the position information being generated by the position information generation unit 36. The transmission control unit 35 determines whether the position of the terminal station indicated by the acquired position information corresponds to (or whether the position is included in) the small area indicated by the area information included in the transmission permission signal (step S624).

In a case in which the position of the terminal station does not correspond to (or is not included in) the small area (No in step S624), the transmission control unit 35 stands by without starting to transmit the terminal uplink signal to the mobile relay station 2b. That is, the terminal station 3 repeats the processes from step S621.

If the position of the terminal station corresponds to (or is included in) the small area (Yes in step S624), the transmission control unit 35 causes the transmitter 32 to start to transmit the terminal uplink signal. At this time, the transmission control unit 35 causes the transmitter 32 to transmit the terminal uplink signal in which the position information indicating the position of the terminal station generated by the position information generation unit 36 has been set, in addition to data such as environmental data. The transmitter 32 transmits the terminal uplink signal (step S625). The terminal station 3 repeats the processes from step S621.

The receivers 221b-1 to 221b-N of the mobile relay station 2b receive the terminal uplink signals using the antennas 21-1 to 21-N (step S631). The reception waveform recording units 222b-1 to 222b-N of the mobile relay station 2b sample the reception waveforms of the terminal uplink signals received by the receivers 221b-1 to 221b-N and generate waveform data indicating the value obtained from the sampling. The reception waveform recording unit 222b-1 to 222b-N write reception waveform information in which the reception times of the terminal uplink signals by the antennas 21-1 to 21-N and the selected waveform data have been set into the data storage unit 23. The data storage unit 23 stores the reception waveform information written by the reception waveform recording units 222b-1 to 222b-N (step S632).

The communication status measurement unit 223b of the mobile relay station 2b measures the communication status of the terminal uplink communication from the plurality of terminal stations 3 for the receivers 221b-1 to 221b-N (step S633) to generate information indicating the congestion level of the communication (congestion level information). The position information acquisition unit 227b of the mobile relay station 2b acquires the position information of each terminal station 3 (step S334). The position information is transmitted from each of the terminal stations 3 and included in the terminal uplink signals received by the receivers 221b-1 to 221b-N.

The timing control unit 224b performs area division to divide a communication target area into a plurality of small areas based on the acquired congestion level information and position information (step S635). As described above, for example, the mobile relay station 2b performs area division such that the congestion levels of the communication are made to be uniform in the divided communication target area. The timing control unit 224b causes the storage unit 225 to store a plurality of pieces of area information generated from the area division (step S636). The mobile relay station 2b repeats the processes from step S631.

According to the present modified example, the mobile relay station 2b receives the terminal uplink signal transmitted from the terminal station 3 in diversity reception, MIMO reception, or the like. Thus, the wireless communication system 1b according to the present modified example can improve the link budget for communication between the mobile relay station 2b and the terminal station 3.

Second Embodiment

The wireless communication systems 1 (1a and 1b) according to the first embodiment described above are configured such that the one mobile relay station 2 transmits a transmission permission signal for each of the plurality of small areas created by dividing a communication target area. In contrast, a wireless communication system 1c according to the present embodiment includes a plurality of mobile relay stations 2c. The wireless communication system 1c performs a process of allocating each of a plurality of small areas to any of the plurality of mobile relay stations 2c (hereinafter, referred to as an "distribution process"). Each mobile relay station 2c includes area information indicating the small area allocated to the mobile relay station 2c in a transmission permission signal to transmit a terminal downlink signal to a terminal station 3.

With this configuration, it is possible to control such that terminal uplink signals transmitted from a plurality of terminal stations 3 located in the communication target area can be distributed (for example, equally) to and received by the plurality of mobile relay stations 2c. As a result, the wireless communication system 1c according to the present embodiment can lower the congestion level of the communication of each of the mobile relay stations 2c and prevent a decrease in communication reliability even when the congestion level of the communication varies.

Figure 10:
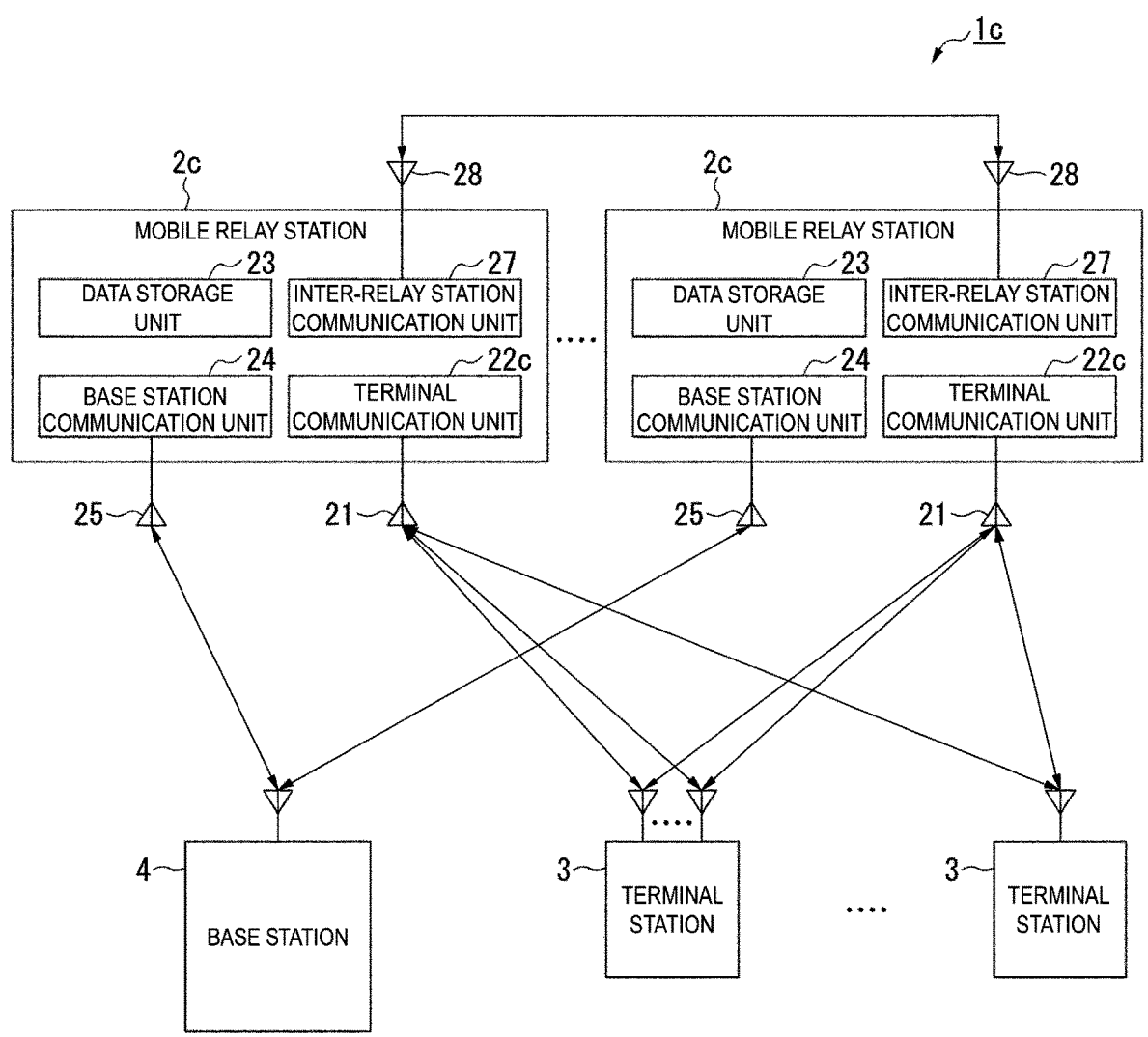
FIG. 10 is a configuration diagram of a wireless communication system according to a second embodiment of the present disclosure.

Hereinafter, differences from the first embodiment will be mainly described. FIG. 10 is a configuration diagram of the wireless communication system 1c according to a second embodiment. In the diagram, the same constituent components as those of the wireless communication system 1 according to the first embodiment illustrated in FIG. 1 are denoted by the same reference signs, and descriptions thereof will be omitted. The wireless communication system 1c includes a plurality of mobile relay stations 2c, terminal stations 3, and a base station 4a. Although the number of mobile relay stations 2c, terminal stations 3, and base stations 4 included in the wireless communication system 1c is optional, the number of terminal stations 3 is assumed to be plural. The wireless communication system 1c is a communication system that transmits information that does not need to be transmitted immediately. Information transmitted from each of a plurality of terminal stations 3 is transmitted via the plurality of mobile relay stations 2c and collected by the base station 4.

The mobile relay stations 2c are an example of a relay apparatus whose communicable area moves according to the passage of time. The plurality of mobile relay stations 2c are each mounted on different mobile objects. The mobile relay stations 2c are, for example, provided in LEO satellites. The plurality of LEO satellites, for example, fly information on a low earth orbit. The terminal stations 3 and the base station 4 are placed on the Earth, such as on the ground or on the sea. The terminal stations 3 are, for example, IoT terminals. The terminal stations 3 collect data such as environmental data detected by sensors and wirelessly transmit the data to the mobile relay stations 2c. In the same drawing, only two terminal stations 3 are illustrated. The mobile relay stations 2c receive the data transmitted from each of the plurality of terminal stations 3 in wireless signals while moving over the Earth. The mobile relay station 2c accumulates the received data, and wirelessly transmits the accumulated data collectively to the base station 4 at a timing at which they can communicate with the base station 4. The base station 4 receives the data collected by the terminal stations 3 from the mobile relay stations 2c.

The mobile relay station 2c includes an antenna 21, a terminal communication unit 22c, a data storage unit 23, a base station communication unit 24, and an antenna 25, an inter-relay station communication unit 27, and an antenna 28.

In the present embodiment, one specific mobile relay station 2c (hereinafter, referred to as a "mobile relay station 2c serving as a host) among a plurality of mobile relay stations 2c performs a process of allocating each of a plurality of small areas to any of the plurality of mobile relay stations 2c (distribution process).

The terminal communication unit 22c of the mobile relay station 2c serving as a host measures a communication status of terminal uplink communication from the plurality of terminal stations 3. The terminal communication unit 22c generates information indicating the congestion level of the communication (congestion level information) based on the measurement result. For example, the terminal communication unit 22c measures the number of access operations of the plurality of terminal stations 3 in the terminal uplink communication per unit time or measures a received signal strength in the frequency band of the terminal uplink communication.

The congestion level information may be information indicating the number of access operations of the plurality of terminal stations 3 in the terminal uplink communication per unit time or a received signal strength in the frequency band of the terminal uplink communication. Alternatively, the congestion level information may be information indicating a level determined based on whether the information indicating the number of access operations of the plurality of terminal stations 3 in the terminal uplink communication per unit time or a received signal strength in the frequency band of the terminal uplink communication is within the range of a predetermined threshold.

In addition, the terminal communication unit 22c acquires position information indicating the positions of the terminal stations 3 included in the terminal uplink communication transmitted from the plurality of terminal stations 3. The terminal communication unit 22c performs area division in which a communication target area is divided into a plurality of small areas based on the acquired congestion level information and position information. For example, the terminal communication unit 22c performs area division such that the congestion level of the communication with the terminal stations 3 included in divided small areas is made to be uniform in the plurality of small areas.

The terminal communication unit 22c performs a process of allocating each of the plurality of small areas obtained by dividing the communication target area to any of the plurality of mobile relay stations 2c (distribution process). The terminal communication unit 22c controls such that, for example, the terminal uplink signals transmitted from the plurality of terminal stations 3 located in the communication target area are distributed to (for example, equally) and received by the plurality of mobile relay stations 2c. The terminal communication unit 22c generates distribution information indicating the result of the distribution process. The distribution information is information in which area information indicating the small areas is associated with information for identifying the mobile relay station 2c allocated for the small area.

The inter-relay station communication unit 27 of each mobile relay station 2c can transmit and/or receive data to and/or from each other using the antenna 28 (inter-satellite communication). Further, for example, a communication band of a 23 GHz band is used for the communication between the mobile relay stations 2c.

The inter-relay station communication unit 27 of the mobile relay station 2c serving as a host station transmits the distribution information generated by the terminal communication unit 22c to another mobile relay station 2c. As a result, the plurality of mobile relay stations 2c can share the distribution information. Each mobile relay station 2c can recognize the small area allocated to the station itself based on the shared distribution information.

The terminal communication unit 22c of the mobile relay station 2c that has recognized the small area allocated to the station itself generates a transmission permission signal at a timing at which communication is possible for the small area. As described above, the transmission permission signal is a control signal indicating that the terminal station 3 has been permitted to transmit data such as environmental data to the mobile relay station 2c.

The terminal communication unit 22c transmits a terminal downlink signal in which the generated transmission permission signal has been set wirelessly from the antenna 21. The terminal communication unit 22c transmits a signal with, for example, LPWA. The terminal communication unit 22c determines a channel to be used for transmission of the terminal downlink signal by the mobile relay station using a method predetermined in the wireless communication scheme being used.

The terminal communication unit 22c stores a transmission start timing for each small area calculated in advance based on the orbit information of the LEO satellite in which the mobile relay station 2c is mounted and the position of the small area. The orbit information of the LEO is information from which a position, a speed, a movement direction, and the like of the LEO satellite at a certain time can be obtained. A transmission time may be represented, for example, by a time elapsed from the transmission start timing. The terminal communication unit 22c transmits the terminal downlink signal in which the transmission permission signal has been set toward the ground at the transmission start timing of the small area to be communicated. At this time, the terminal communication unit 22c includes area information allocated to the station itself in the set transmission permission signal.

The terminal communication unit 22c includes, for example, the area information generated and allocated based on the congestion level of the communication when the terminal uplink signal has been received in the same communication target area at the time point one orbiting cycle before in the transmission permission signal. Alternatively, the terminal communication unit 22c may include, for example, the area information generated and allocated based on the congestion level of the communication when the terminal uplink signals were received in the same communication target area in the same time slot in the past in the transmission permission signal.

Although, in the present embodiment, the mobile relay station 2c serving as a host station transmits distribution information to the other mobile relay station 2c, the mobile relay station 2c does not necessarily transmit the distribution information. For example, the mobile relay station 2c serving as a host station may transmit area information corresponding to each of other mobile relay stations 2c.

Although, in the present embodiment, the specific mobile relay station 2c serving as a host station performs the distribution process, the specific mobile relay station 2c does not necessarily performs the distribution process. For example, the mobile relay station 2c to serve as a host station may be switched among a plurality of the mobile relay stations 2c based on a time slot, a position, or the like. Alternatively, for example, the base station 4 may acquire congestion level information and position information (or area information) indicating the positions of the terminal stations 3 from at least one mobile relay station 2c to perform the distribution process. In this case, for example, the base station 4 transmits distribution information generated from the distribution process to the plurality of mobile relay stations 2c.

Figure 11:
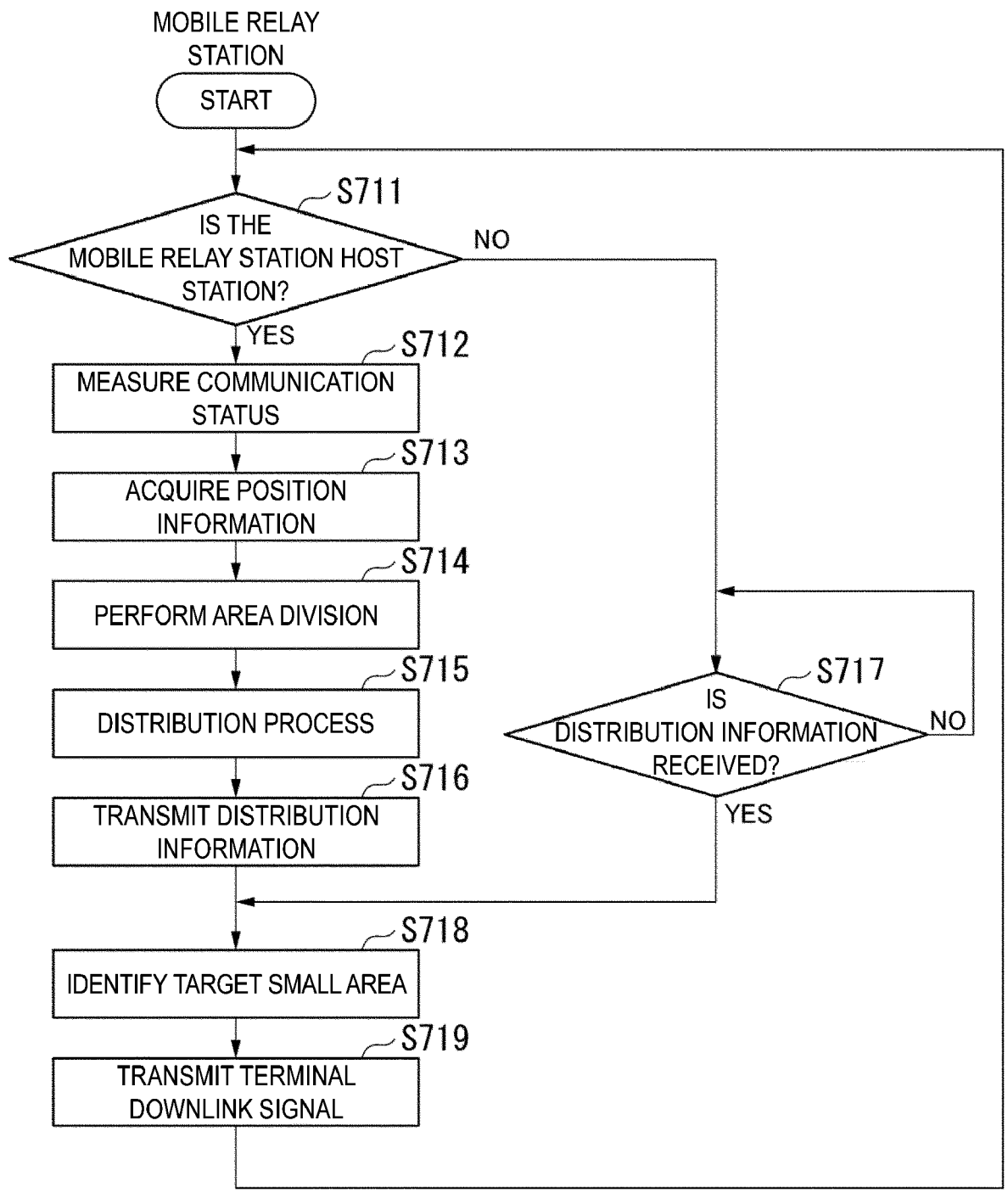
FIG. 11 is a flowchart illustrating a transmission control process of the wireless communication system according to the embodiment.

An operation of the wireless communication system 1c will be described. FIG. 11 is a flowchart illustrating the distribution process performed by the mobile relay station 2c serving as a host station.

If the mobile relay station 2c is a mobile relay station 2c serving as a host station (Yes in step S711), the terminal communication unit 22c of the mobile relay station measures the communication status of terminal uplink communication from the plurality of terminal stations 3 (step S712). Information for determining whether the mobile relay station is a host station is stored in advance in the terminal communication unit 22c, for example. Alternatively, information for determining whether the mobile relay station is a host station may be notified to the mobile relay station 2c from the base station 4 at any time.

The terminal communication unit 22c generates information indicating the congestion level of the communication (congestion level information) based on the measurement result. For example, the terminal communication unit 22c measures the number of access operations of the plurality of terminal stations 3 in the terminal uplink communication per unit time or measures a received signal strength in the frequency band of the terminal uplink communication, as described above. The congestion level information may be information indicating the number of access operations of the plurality of terminal stations 3 in the terminal uplink communication per unit time or the received signal strength in the frequency band of the terminal uplink communication, as described above. Alternatively, the congestion level information may be information indicating a level determined based on whether the information indicating the number of access operations of the plurality of terminal stations 3 in the terminal uplink communication per unit time or a received signal strength in the frequency band of the terminal uplink communication is within the range of a predetermined threshold.

In addition, the terminal communication unit 22c acquires each piece of position information indicating the positions of the terminal stations 3 included in the terminal uplink communication transmitted from the plurality of terminal stations 3 (step S713).

The terminal communication unit 22c performs area division in which a communication target area is divided into a plurality of small areas based on the acquired congestion level information and position information (step S714). For example, the terminal communication unit 22c performs area division such that the congestion level of the communication with the terminal stations 3 included in divided small areas is made to be uniform in the plurality of small areas.

The terminal communication unit 22c performs a process of allocating each of the plurality of small areas obtained by dividing the communication target area to any of the plurality of mobile relay stations 2c (distribution process) (step S715). The terminal communication unit 22c controls such that, for example, the terminal uplink signals transmitted from the plurality of terminal stations 3 located in the communication target area are distributed to (for example, equally) and received by the plurality of mobile relay stations 2c. The terminal communication unit 22c generates distribution information indicating the result of the distribution process. The distribution information is information in which area information indicating the small areas is associated with information for identifying the mobile relay station 2c allocated for the small area, as described above.

The inter-relay station communication unit 27 of the mobile relay station 2c transmits the distribution information generated by the terminal communication unit 22c to another mobile relay station 2c (step S715).

The terminal communication unit 22c of the mobile relay station 2c identifies the small area allocated to the mobile relay station based on the distribution information (step S718). The terminal communication unit 22c generates a transmission permission signal at a timing at which communication is possible for the small area. The terminal communication unit 22c transmits a terminal downlink signal in which the generated transmission permission signal has been set wirelessly from the antenna 21 (step S719). The terminal communication unit 22c transmits the terminal downlink signal in which the transmission permission signal has been set toward the ground at the transmission start timing for the small area to be communicated. At this time, the terminal communication unit 22c includes area information indicating the small area allocated to the mobile relay station in the set transmission permission signal.

The terminal communication unit 22c includes, for example, the area information generated and allocated based on the congestion level of the communication when the terminal uplink signal has been received in the same communication target area at the time point one orbiting cycle before in the transmission permission signal. Alternatively, the terminal communication unit 22c may include, for example, the area information generated and allocated based on the congestion level of the communication when the terminal uplink signals were received in the same communication target area in the same time slot in the past in the transmission permission signal. The mobile relay station 2c serving as a host station repeats the processes from step S711.

On the other hand, when the mobile relay station 2c is not a mobile relay station 2c serving as a host station (No in step S711), the terminal communication unit 22c of the mobile relay station awaits reception of the distribution information transmitted from the mobile relay station 2c serving as a host station (step S717). When the terminal communication unit 22c receives the distribution information (Yes in step 717), the terminal communication unit identifies the small area allocated to the mobile relay station based on the distribution information (step S718). The terminal communication unit 22c generates a transmission permission signal at a timing at which communication is possible for the small area. The terminal communication unit 22c transmits a terminal downlink signal in which the generated transmission permission signal has been set wirelessly from the antenna 21 (step S719). The terminal communication unit 22c transmits the terminal downlink signal in which the transmission permission signal has been set toward the ground at the transmission start timing for the small area to be communicated. At this time, the terminal communication unit 22c includes area information indicating the small area allocated to the mobile relay station in the set transmission permission signal.

The terminal communication unit 22c includes, for example, the area information generated and allocated based on the congestion level of the communication when the terminal uplink signal has been received in the same communication target area at the time point one orbiting cycle before in the transmission permission signal. Alternatively, the terminal communication unit 22c may include, for example, the area information generated and allocated based on the congestion level of the communication when the terminal uplink signals were received in the same communication target area in the same time slot in the past in the transmission permission signal. The mobile relay station 2c that is not a host station repeats the processes from step S711.

The wireless communication system 1c according to the second embodiment performs the process of allocating each of the plurality of small areas to any of the plurality of mobile relay stations 2c (distribution process) as described above. Each mobile relay station 2c transmits a transmission permission signal for the small area allocated to the station itself. With this configuration, it is possible to control such that terminal uplink signals transmitted from the plurality of terminal stations 3 located in the communication target area can be distributed (for example, equally) to and received by the plurality of mobile relay stations 2c. As a result, the wireless communication system 1c according to the present embodiment can lower the congestion level of the communication of each of the mobile relay stations 2c and prevent a decrease in communication reliability even when the congestion level of the communication varies.

In addition, each mobile relay stations 2c sets the transmission permission signal including the area information in the terminal downlink signal and transmits the signal to a terminal station 3. The terminal station 3 acquires the transmission permission signal indicated by the received terminal downlink signal and determines whether to start to transmit a terminal uplink signal to the mobile relay station 2c based on the area information included in the transmission permission signal. With this configuration, the wireless communication system 1c can control the transmission timing for the terminal uplink signal from the terminal station 3 to the mobile relay station 2c. With this configuration, in the wireless communication system 1c, even when a congestion level of communication varies, sensor data transmitted from a large number of terminal stations 3 can be transmitted to the base station 4 via the mobile relay stations 2c while preventing a decrease in communication reliability.

Third Embodiment

The wireless communication systems 1 (1a, 1b, and 1c) according to the first and second embodiments described above have the configuration in which the mobile relay stations 2 (2a, 2b, and 2c) receive terminal uplink signals transmitted from the plurality of terminal stations 3 and measure the communication status. In addition, the wireless communication systems 1 (1a, 1b, and 1c) have a configuration in which the mobile relay stations 2 (2a, 2b, and 2c) perform area division of dividing a communication target area into small areas based on a congestion level status based on the measured communication status and position information indicating the position of each terminal stations 3 included in the terminal uplink signal. In addition, the mobile relay stations 2 (2a, 2b, and 2c) are configured to permit transmission of the terminal uplink signal by the terminal station 3 for each divided small area.

In other words, the wireless communication systems 1 (1a, 1b, and 1c) according to the first and second embodiments described above have the configuration in which the mobile relay stations 2 (2a, 2b, and 2c) control transmission timings of terminal uplink signals by the terminal stations 3. In contrast, a wireless communication system 1d according to the present embodiment has a configuration in which each terminal station 3d autonomously controls transmission timings of terminal uplink signals.

Hereinafter, differences from the first embodiment will be mainly described.

Figure 12:
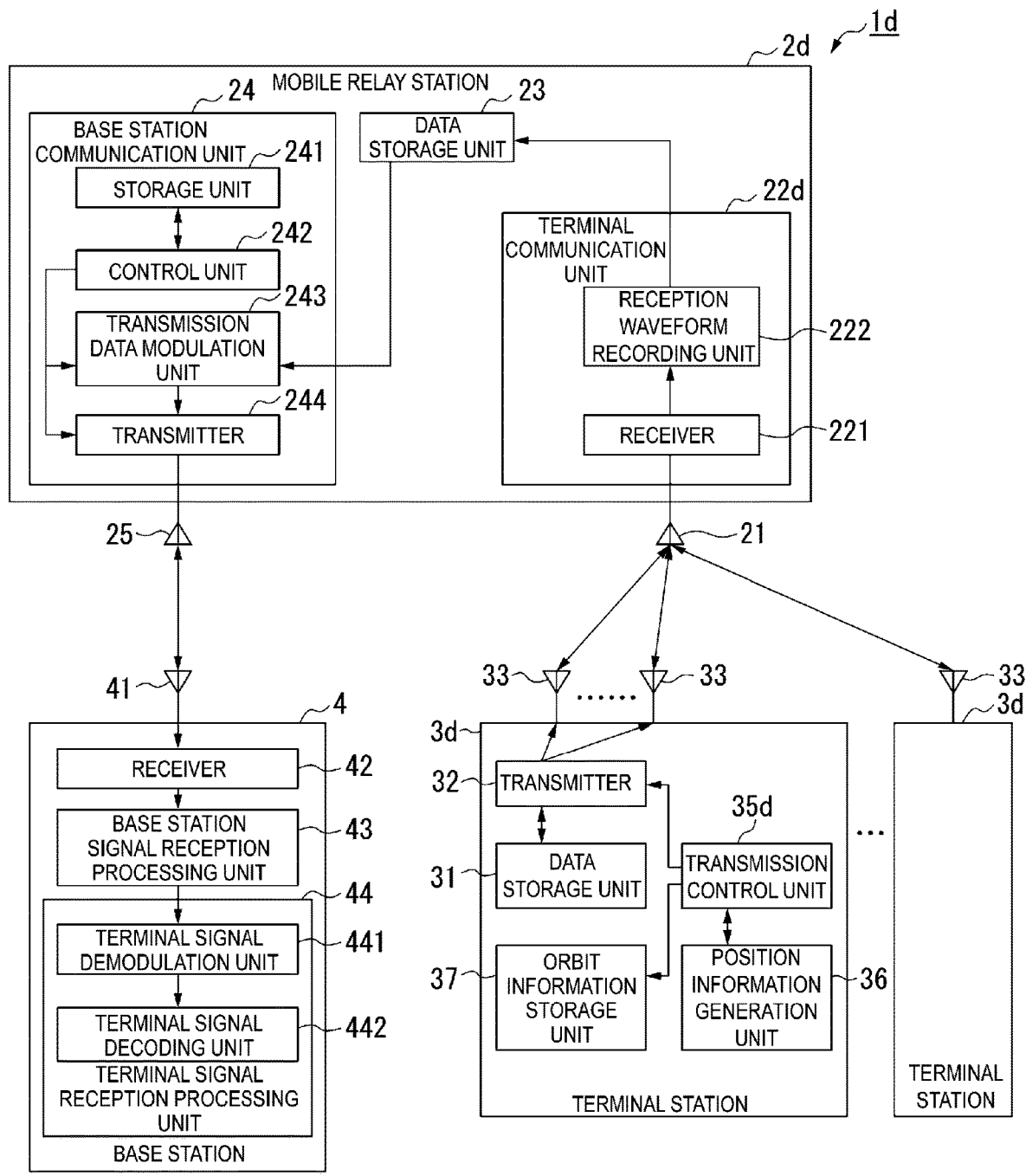
FIG. 12 is a configuration diagram of a wireless communication system according to a third embodiment of the present disclosure.

FIG. 12 is a configuration diagram of the wireless communication system 1d according to a third embodiment. In the diagram, the same constituent components as those of the wireless communication system 1 according to the first embodiment illustrated in FIG. 1 are denoted by the same reference signs, and descriptions thereof will be omitted.

The wireless communication system 1d includes a mobile relay station 2d, terminal stations 3d, and a base station 4 as illustrated in FIG. 12. Although the number of mobile relay stations 2d, terminal stations 3d, and base stations 4 included in the wireless communication system 1d is optional, the number of terminal stations 3d is assumed to be plural. The wireless communication system 1d is a communication system that transmits information that does not need to be transmitted immediately. Information transmitted from each of the plurality of terminal stations 3d is transmitted via the mobile relay station 2d and collected by the base station 4.

The mobile relay station 2d is an example of a relay apparatus that is mounted on a mobile object and has a communicable area that moves according to the passage of time. The mobile relay station 2d is, for example, provided in a LEO satellite. The altitude of the LEO satellite orbits over the Earth. The terminal stations 3d and the base station 4 are placed on the Earth, such as on the ground or on a sea. The plurality of terminal stations 3d are placed at different locations from each other. The terminal stations 3d are, for example, IoT terminals. The terminal stations 3d collect data such as environmental data detected by sensors and wirelessly transmit the data to the mobile relay station 2d. In the same drawing, only two terminal stations 3d are illustrated. The mobile relay station 2d receives the data transmitted from each of the plurality of terminal stations 3d in wireless signals while moving over the Earth. The mobile relay station 2d accumulates the received data, and wirelessly transmit the accumulated data collectively to the base station 4 at a timing at which they can communicate with the base station 4. The base station 4 receives the data collected by the terminal stations 3d from the mobile relay station 2d.

Although it is possible to use a relay station mounted in an unmanned aerial vehicle such as a geostationary orbit satellite, a drone, or a HAPS as the mobile relay station 2d, the mobile relay station 2d is mounted in a LEO satellite in the present embodiment. The mobile relay station 2d mounted in the LEO satellite has a limited time in which it can communicate with the individual terminal stations 3d and the base station 4 because the mobile relay station 2d communicates while moving at a high speed. The mobile relay station 2d receives a terminal uplink signal from the terminal stations 3d in the coverage at a current position during movement and stores waveform data of the received terminal uplink signal.

The mobile relay station 2d wirelessly transmits a base station downlink signal in which the waveform data of the terminal uplink signal has been set to the base station 4 at the timing at which the base station 4 is placed in the coverage. The base station 4 demodulates the base station downlink signal received from the mobile relay station 2d to obtain the waveform data of the terminal uplink signal. The base station 4 demodulates and decodes the terminal uplink signal represented by the waveform data and obtains terminal transmission data which is the data transmitted by the terminal stations 3d.

Further, the wireless communication system 1d according to the present embodiment is assumed to have the configuration in which the mobile relay station 2d and the terminal station 3d perform wireless communication using LPWA. Each terminal station 3d may be configured to transmit the same terminal uplink signal to the mobile relay station 2d multiple times to ensure communication reliability.

Furthermore, it is assumed that the number of terminal stations 3d is plural as described above. With this configuration, a communication amount of data transmitted from the terminal stations 3d to the mobile relay station 2d may increase, and a communication bandwidth may be tight. The wireless communication system 1d according to the present embodiment controls transmission timings in transmission of data from the terminal stations 3d to the mobile relay station 2d to prevent the communication bandwidth from being tight. Transmission timings are autonomously controlled by individual terminal stations 3d based on the orbit of the mobile relay station 2d and the positions of the terminal stations 3d.

Specifically, each terminal station 3d stores information indicating the orbit of the mobile relay station 2d (hereinafter, referred to as "orbit information"). Further, the terminal station 3d includes a positioning device such as a GPS receiver, for example, and thus can generate position information indicating a position of the terminal station and measure a current time.

The terminal station 3d identifies a time slot in which the terminal station can communicate with the mobile relay station 2d (hereinafter, referred to as a "communicable time slot") based on the orbit information and the position information indicating the position of the terminal station. The terminal station 3d determines a time at which the terminal station starts transmitting a terminal uplink signal to the mobile relay station 2d (hereinafter, referred to as a "transmission start time") based on the identified communicable time slot. The terminal station 3d measures a current time to start to transmit the terminal uplink signal to the mobile relay station 2d at the timing of the transmission start time.

Here, the mobile relay station 2d determines a time randomly selected from among communicable time slots as the transmission start time, for example. In this manner, even in a case in which a plurality of terminal stations 3d are placed in proximity to each other, it is possible not to start to simultaneously transmit terminal uplink signals from the plurality of terminal stations 3d to the mobile relay station 2d. As a result, the wireless communication system 1d according to the present embodiment can prevent the communication band for communication of the mobile relay station 2d from being tight.

The terminal station 3d may not determine a time selected from among the communicable time slots as a transmission start time, but may determine, for example, a time calculated based on the position of the terminal station obtained from the positioning device (for example, the latitude and longitude) and a predetermined calculation rule as a transmission start time.

Configurations of each apparatus will be described. The mobile relay station 2d includes an antenna 21, a terminal communication unit 22d, a data storage unit 23, a base station communication unit 24, and an antenna 25 as illustrated in FIG. 12.

The terminal communication unit 22d includes a receiver 221 and a reception waveform recording unit 222. The receiver 221 receives a terminal uplink signal from the antenna 21. The reception waveform recording unit 222 samples the reception waveform of the terminal uplink signal received by the receiver 221 and generates waveform data indicating the value obtained from the sampling. The reception waveform recording unit 222 writes reception waveform information in which the reception time of the terminal uplink signal by the antenna 21 and the generated waveform data have been set into the data storage unit 23. The data storage unit 23 stores the reception waveform information written by the reception waveform recording unit 222. Configurations of the base station communication unit 24 of the mobile relay station 2d and the base station 4 are similar to those of the base station communication unit 24 of the mobile relay station 2 and the base station 4 of the wireless communication system 1 according to the first embodiment described above.

The terminal station 3d includes a data storage unit 31, a transmitter 32, and one or a plurality of antennas 33, a transmission control unit 35d, a position information generation unit 36, and an orbit information storage unit 37. The data storage unit 31 stores sensor data and the like. The transmitter 32 reads the sensor data as the terminal transmission data from the data storage unit 31, and wirelessly transmits a terminal uplink signal in which the read terminal transmission data has been set from the antennas 33. The transmitter 32 transmits the signal using, for example, LPWA. The transmitter 32 determines a channel and a transmission timing to be used by the terminal station in transmission of the terminal uplink signal using a method predetermined in the wireless communication scheme to be used. In addition, the transmitter 32 may perform beamforming of signals transmitted from the plurality of antennas 33 using the method predetermined in the wireless communication scheme to be used.

The orbit information storage unit 37 stores information indicating an orbit of the mobile relay station 2d (orbit information) in advance. The position information generation unit 36 includes a positioning device such as a GPS receiver, for example, to identify the position of the terminal station. The position information generation unit 36 generates position information indicating the identified position of the terminal station 3. The transmission control unit 35d identifies a time slot in which the transmitter 32 can communicate with the mobile relay station 2d (hereinafter, referred to as a "communicable time slot") based on the orbit information stored in the orbit information storage unit 37 and the position information indicating the position of the terminal station identified by the position information generation unit 36. The transmission control unit 35d determines a time at which the terminal station starts transmitting a terminal uplink signal to the mobile relay station 2d (a transmission start time) based on the identified communicable time slot. The transmission start time is determined within the range of the communicable time slot. The transmission control unit 35d measures a current time and controls the transmitter 32 so as to start to transmit the terminal uplink signal to the mobile relay station 2d at the timing of the transmission start time. The transmitter 32 starts to transmit the terminal uplink signal to the mobile relay station 2d according to the control of the transmission control unit 35d.

The mobile relay station 2d determines a randomly selected time in the range of the communicable time slot as the transmission start time, for example, as described above. As a result, the wireless communication system 1d according to the present embodiment can prevent the communication band for communication of the mobile relay station 2d from being tight. Further, the terminal station 3d may determine, for example, a time calculated based on the position of the terminal station obtained by the positioning device (for example, the latitude and longitude) and the predetermined calculation rule as the transmission start time.

Figure 13:
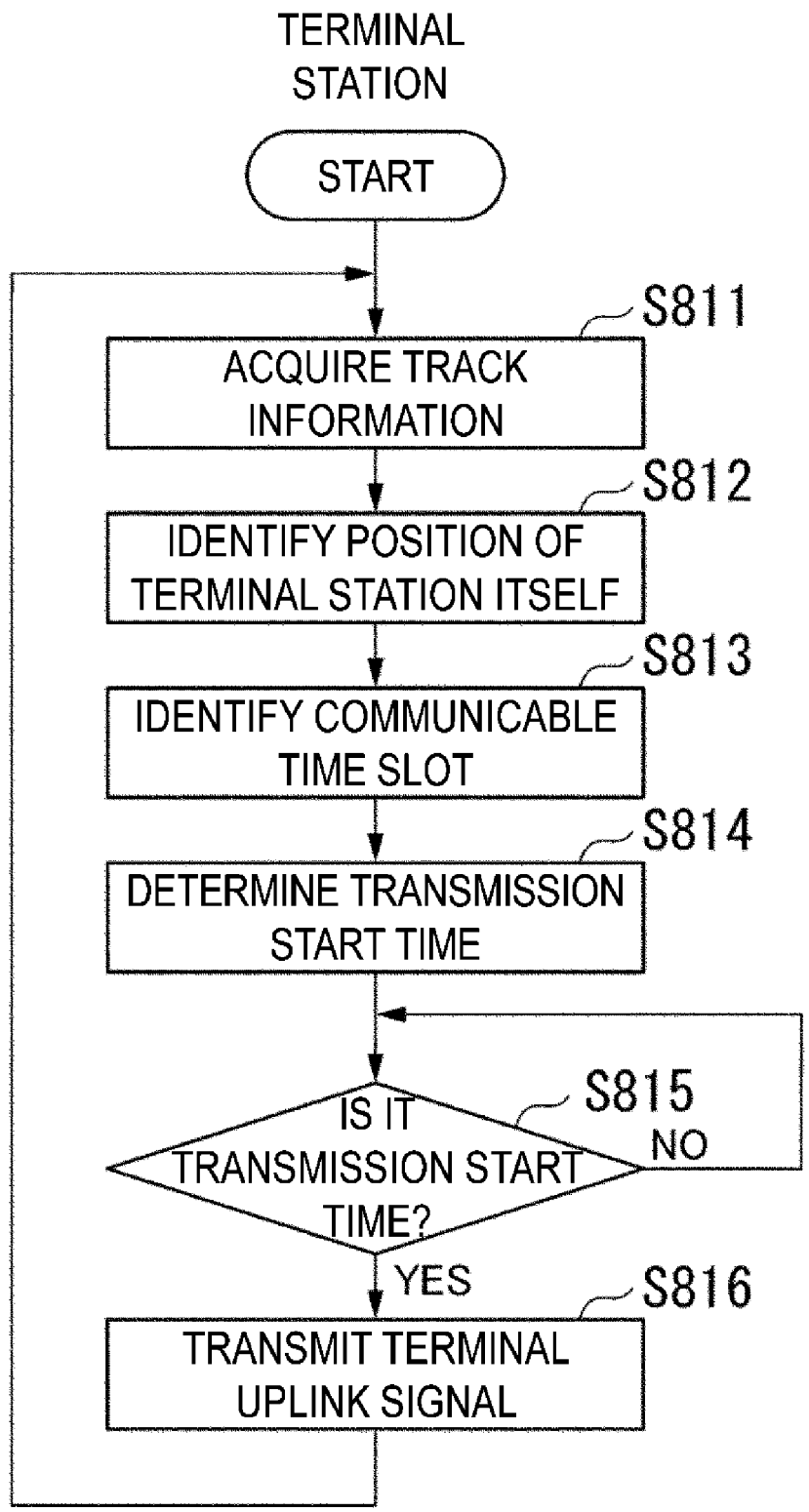
FIG. 13 is a flowchart illustrating a transmission control process of the wireless communication system according to the embodiment.

An operation of the terminal station 3d will be described. FIG. 13 is a flowchart illustrating a transmission timing control process of the terminal uplink signal by the terminal station 3d.

The transmission control unit 35d of the terminal station 3d acquires the orbit information stored in the orbit information storage unit 37 (step S811). The position information generation unit 36 of the terminal station 3d identifies the position of the terminal station with the positioning device such as a GPS receiver, for example, (step S812). The position information generation unit 36 generates position information indicating the identified position of the terminal station 3. The transmission control unit 35d identifies a time slot in which the transmitter 32 can communicate with the mobile relay station 2d (a communicable time slot) based on the orbit information and the position information generated by the position information generation unit 36 (step S813). The transmission control unit 35d determines a time at which transmission of a terminal uplink signal to the mobile relay station 2d starts (a transmission start time) based on the identified communicable time slot (step S814).

The transmission control unit 35d measures the current time and stands by until the current time reaches the transmission start time. When the current time reaches the transmission start time (Yes in step S815), the transmission control unit 35d performs control such that the transmitter 32 starts transmitting the terminal uplink signal to the mobile relay station 2d. The transmitter 32 starts transmission of the terminal uplink signal to the mobile relay station 2d (step S816). The terminal station 3d repeats the processes from step S811.

As described above, the wireless communication system 1d according to the third embodiment has a configuration in which each terminal station 3d autonomously controls transmission timings of terminal uplink signals. Each terminal station 3d identifies a communicable time slot for communication with the mobile relay station 2d based on the orbit information indicating the orbit of the mobile relay station 2d and the position information indicating the position of the terminal station. The terminal station 3d determines a transmission start time of a terminal uplink signal based on the identified communicable time slot. In this case, the terminal station 3d randomly determines the transmission start time within the range of the communicable time slot, for example.

With such a configuration, the wireless communication system 1d according to the third embodiment can reduce the congestion level of communication for the mobile relay station 2d. As a result, the wireless communication system 1d can prevent a decrease in communication reliability even when the congestion level of the communication varies.

First Modified Example of Third Embodiment

The following configuration is also possible in a case in which a plurality of mobile relay stations 2d are included.

The terminal station 3d stores correspondence information in which a specific mobile relay station 2d is associated with an area in advance (for example, small areas described above) in advance. The terminal station 3d recognizes the area including the identified position of the terminal station by identifying its position. The terminal station 3d identifies the mobile relay station 2d corresponding to the area including its position by referring to the above-described correspondence information. The terminal station 3d transmits a terminal uplink signal to the identified mobile relay station 2d.

At this time, the terminal station 3d identifies a communicable time slot for communication with the mobile relay station 2d based on the orbit information of the identified mobile relay station 2d and the position information indicating the position of the terminal station. The terminal station 3d determines a transmission start time of the terminal uplink signal with respect to the mobile relay station 2d in the range of the identified communicable time slot. In this case, the terminal station 3d randomly determines the transmission start time within the range of the communicable time slot, for example.

With such a configuration, the wireless communication system according to the present modified example can reduce the congestion level of communication for the mobile relay station 2d. As a result, the wireless communication system 1d can prevent a decrease in communication reliability even when the congestion level of the communication varies.

Second Modified Example of Third Embodiment

The configuration described below can also be possible when a signal with which position information can be estimated, for example, a beacon (which will be referred to as a "beacon, or the like") can be transmitted from the mobile relay station 2d to the terminal station 3d.

The mobile relay station 2d transmits a beacon, or the like at predetermined intervals, for example, toward the ground. When each terminal station 3d receives the beacon, etc. transmitted from the mobile relay station 2d, the terminal station 3d estimates the position of the mobile relay station 2d based on the beacon or the like. The terminal station 3d corrects the orbit information of the mobile relay station 2d stored in the orbit information storage unit 37 based on the estimated position of the mobile relay station 2d and the current time.

The terminal station 3d identifies a communicable time slot for communication with the mobile relay station 2d based on the corrected orbit information and the position information indicating the position of the terminal station. The terminal station 3d determines a transmission start time of a terminal uplink signal based on the identified communicable time slot. In this case, the terminal station 3d randomly determines the transmission start time within the range of the communicable time slot, for example.

With such a configuration, the wireless communication system according to the present modified example can improve accuracy in calculation of a communicable time slot for communication between the mobile relay station 2d and each terminal station 3d.

According to the above-described embodiments and modified examples thereof, the wireless communication system wirelessly communicates with a relay apparatus provided in a mobile object and a plurality of communication apparatuses placed in different locations. For example, the relay apparatus is the mobile relay station 2, 2a, 2b, or 2c and the communication apparatuses are the terminal stations 3 in the embodiments.

The relay apparatus includes a relay apparatus receiver, a measurement unit, a relay apparatus control unit, and a relay apparatus transmitter. For example, the relay apparatus receiver includes the antenna 21 and the receivers 221 and 221b in the embodiments, and the measurement unit includes the communication status measurement units 223 and 223b in the embodiments, and the relay apparatus control unit includes the timing control units 224 and 224b in the embodiments, and the relay apparatus transmitter includes the antenna 21 and the transmitters 226 and 226b.

The relay apparatus receiver receives a signal transmitted from the plurality of communication apparatuses, the signal including position information indicating the position of the communication apparatus. For example, the signal is a terminal uplink signal in the embodiments. The measurement unit measures a congestion level of communication with the relay apparatus receiver. The relay apparatus control unit divides a communication target area into a plurality of small areas based on positions of the plurality of communication apparatuses and a congestion level of communication, and generates area information indicating the position of a small area. The relay apparatus transmitter sequentially transmits a plurality of pieces of area information when the replay apparatus is positioned in the range in which it can communicate with the communication apparatus.

The communication apparatus includes a storage unit, a communication apparatus receiver, a communication apparatus control unit, and a communication apparatus transmitter. For example, the storage unit is the data storage unit 31 in the embodiments, the communication apparatus receiver is the antennas 33 and the receiver 34 in the embodiments, and the communication apparatus control unit is the transmission control unit 35 in the embodiments, and the communication apparatus transmitter is the antennas 33 and the transmitter 32 in the embodiments.

The storage unit stores transmission data to be transmitted to the relay apparatus. For example, the transmission data is data such as environmental data in the embodiments. The communication apparatus receiver receives area information. The communication apparatus control unit determines whether a position of the terminal station is included in a small area based on the area information. If a position of the terminal station is included in a small area, the communication apparatus transmitter transmits a signal including the transmission data and the position information indicating the position of the terminal station to the relay apparatus. For example, the signal is a terminal uplink signal in the embodiments.

Further, the relay apparatus control unit may divide a communication target area into a plurality of small areas with uniform congestion levels of communication.

The congestion level of communication may be information indicating the number of access operations with signals to the relay apparatus receiver per unit time and information indicating a received signal strength. For example, the signal is a terminal uplink signal in the embodiments.

Further, the relay apparatus may be provided in a mobile object that orbits over the Earth, and the relay apparatus transmitter may transmit area information generated in the previous orbiting cycle to the communication apparatus.

Further, the mobile object may be a low Earth orbit satellite, the communication apparatus may be provided in a terminal apparatus including a sensor, and the signal may be a signal indicating sensor data measured by the terminal apparatus.

Further, the wireless communication system may further include a base station apparatus that communicates wirelessly with the relay apparatus. For example, the base station apparatus is the base station 4 in the embodiments. The relay apparatus may transmit a signal based on signals transmitted from the plurality of communication apparatuses to the base station apparatus when the relay apparatus is positioned in a range in which the relay apparatus can communicate with the base station apparatus. For example, the signal based on signals transmitted from the plurality of communication apparatuses is a base station downlink signal in the embodiments.

In addition, according to the above-described embodiment and modified example thereof, the communication apparatus that wirelessly communicates with the relay apparatus provided in the mobile object includes a storage unit, a control unit, and a transmitter. For example, the storage unit is the data storage unit 31 and the orbit information storage unit 37 in the embodiment, the control unit is the transmission control unit 35d in the embodiment, and the transmitter is the antennas 33 and the transmitter 32 in the embodiment.

The storage unit stores transmission data to be transmitted to the relay apparatus and orbit information indicating the orbit of the mobile object. For example, the transmission data is data such as environmental data in the embodiments. The control unit identifies a communicable time slot that is a time slot in which the communication apparatus can communicate with the relay apparatus based on the orbit information and the position of the communication apparatus. The transmitter transmits the transmission data to the relay apparatus in the communicable time slot.

Further, the transmitter may transmit transmission data at a time determined randomly within the range of the communicable time slot.

Further, although the mobile object in which the mobile relay station is mounted has been described as a LEO satellite in the first to third embodiments and the modified examples of the embodiments described above, the mobile object may be another type of flying object that flies in the air, such as a geostationary orbit satellite, a drone, or a HAPS.

Some of the mobile relay stations 2, 2a, 2b, 2c, and 2d, the terminal stations 3 and 3d, and the base stations 4, 4a, and 4b in the above-described embodiments may be implemented by a computer. In that case, the functions may be implemented by recording a program for implementing the functions in a computer readable recording medium and causing a computer system to read and execute the program recorded in the recording medium. Note that the "computer system" described here is assumed to include an OS and hardware such as a peripheral device. The "computer-readable recording medium" means a portable medium such as a flexible disk, a magneto-optical disk, a ROM, or a CD-ROM or a storage device such as a hard disk incorporated in the computer system. Moreover, the "computer-readable recording medium" may include a recording medium that dynamically holds the program for a short period of time, such as a communication line in a case in which the program is transmitted via a network such as the Internet or a communication line such as a telephone line, or a recording medium that holds the program for a specific period of time, such as a volatile memory inside a computer system that serves as a server or a client in that case. Furthermore, the aforementioned program may be for implementing some of the aforementioned functions, or may be able to implement the aforementioned functions in combination with a program that has already been recorded in the computer system, or using a programmable logic device such as a field programmable gate array (FPGA).

Although the embodiments of the present disclosure have been described in detail with reference to the drawings, a specific configuration is not limited to the embodiments, and a design or the like in a range that does not depart from the gist of the present disclosure is included.

REFERENCE SIGNS LIST 1, 1a, 1b, 1c, 1d Wireless communication system
2, 2a, 2b, 2c, 2d Mobile relay station
3, 3d Terminal station
4, 4a, 4b Base station
21, 21-1 to 21-N Antenna
22, 22b, 22c, 22d Terminal communication unit
23 Data storage unit
24 Base station communication unit
25 Antenna
26 Base station communication unit
27 Inter-relay station communication unit
28 Antenna
31 Data storage unit
32 Transmitter
33 Antenna
34 Receiver
35, 35d Transmission control unit
36 Position information generation unit
41 Antenna
42 Receiver
43 Base station signal reception processing unit
44 Terminal signal reception processing unit
221, 221b, 221b-1 to 221b-N Receiver
222, 222b, 222b-1 to 222b-N Reception waveform recording unit
223, 223b Communication status measurement unit
224, 224b Timing control unit
225 Storage unit
226, 226b Transmitter
227, 227b Position information acquisition unit
241 Storage unit
242 Control unit
243 Transmission data modulation unit
244 Transmitter
261 Storage unit
262 Control unit
263 Transmission data modulation unit
264 MIMO transmitter
410 Antenna station
420 MIMO receiver
430 Base station signal reception processing unit
441 Terminal signal demodulation unit
442 Terminal signal decoding unit
450 Terminal signal reception processing unit
451 Distribution unit
452, 452-1 to 452-N Terminal signal demodulation unit
453 Combining unit
454 Terminal signal decoding unit

The invention claimed is:

1. A wireless communication system in which a relay apparatus provided in a mobile object wirelessly communicates with a plurality of communication apparatuses placed at different locations,
wherein the relay apparatus comprising:
a processor; and a storage medium having computer program instructions stored thereon, wherein the computer program instructions, when executed by the processor, perform to:

receive a plurality of signals transmitted from the plurality of communication apparatuses and including position information indicating positions of the plurality of communication apparatuses;

measure a congestion level of communication in the receiving;

divide a communication target area into a plurality of small areas in accordance with the positions of the plurality of communication apparatuses and the congestion level of communication, and generate area information indicating positions of the plurality of small areas; and sequentially transmit a plurality of pieces of the area information when the relay apparatus is positioned in a range in which the relay apparatus can communicate with the plurality of communication apparatuses, and each of the plurality of communication apparatuses comprising:

a processor; and a storage medium having computer program instructions stored thereon, wherein the computer program instructions, when executed by the processor, perform to:

store transmission data to be transmitted to the relay apparatus;

receive the area information;

determine whether a position of the communication apparatus is included in the plurality of small areas indicated in the area information; and transmit a signal including the transmission data and position information indicating a position of the communication apparatus to the relay apparatus in a case in which the position of the communication apparatus is included in the plurality of small areas.

2. The wireless communication system according to claim 1, wherein the computer program instructions of the relay apparatus further perform to:

divide the communication target area into a plurality of small areas with a uniform congestion level of communication.

3. The wireless communication system according to claim 1, wherein the congestion level of communication is information indicating the number of access operations to the signal per unit time in the receiving and information indicating a received signal strength of the signal.

4. The wireless communication system according to claim 1, wherein the relay apparatus is provided in the mobile object that orbits over the Earth, and the computer program instructions of the relay apparatusfurther perform to:

transmit, to the communication apparatus, the area information generated in a previous orbiting cycle.

5. The wireless communication system according to claim 4, wherein the mobile object is a low Earth orbit satellite, the communication apparatus is provided in a terminal apparatus including a sensor, and a signal is a signal indicating sensor data measured by the terminal apparatus.

6. The wireless communication system according to claim 1, further comprising:

a base station apparatus configured to wirelessly communicate with the relay apparatus, wherein the relay apparatus transmits, to the base station apparatus, a signal based on the signal transmitted from each of the plurality of communication apparatuses when the relay apparatus is positioned in a range in which the relay apparatus can communicate with the base station apparatus.

7. A wireless communication method in which a relay apparatus provided in a mobile object wirelessly communicates with a plurality of communication apparatuses placed at different locations, the method comprising:

by the relay apparatus, receiving a plurality of signals transmitted from the plurality of communication apparatuses and including position information indicating positions of the plurality of communication apparatuses;

measuring a congestion level of communication in the receiving of the signal;

dividing a communication target area into a plurality of small areas in accordance with the positions of the plurality of communication apparatuses and the congestion level of communication and generate area information indicating positions of the plurality of small areas; and sequentially transmitting a plurality of pieces of the area information when the relay apparatus is positioned in a range in which the relay apparatus can communicate with the plurality of communication apparatuses, and by each of the plurality of communication apparatuses, storing transmission data to be transmitted to the relay apparatus;

receiving the area information;

determining whether a position of the communication apparatus is included in the plurality of small areas indicated in the area information; and transmitting a signal including the transmission data and position information indicating a position of the communication apparatus to the relay apparatus in a case in which the position of the communication apparatus is included in the plurality of small areas.

* * * * *